United States Patent
Ultsch et al.

(10) Patent No.: US 10,913,377 B2
(45) Date of Patent: Feb. 9, 2021

(54) VEHICLE SEAT HAVING A LOCKING MECHANISM FOR LOCKING A CUSHION CARRIER, WHICH CAN BE LOWERED AT LEAST IN SECTIONS, DURING AN ADJUSTMENT OF A BACKREST

(71) Applicant: Brose Fahrzeugteile GmbH & Co. Kommanditgesellschaft, Coburg, Coburg (DE)

(72) Inventors: Johannes Ultsch, Lichtenfels (DE); Sascha Hartmann, Coburg (DE); Herwig Eberwein, Wohlbach (DE)

(73) Assignee: Brose Fahrzeugteile GmbH & Co. Kommanditgesellschaft, Coburg, Coburg (DE)

( * ) Notice: Subject to any disclaimer, the term of this patent is extended or adjusted under 35 U.S.C. 154(b) by 0 days.

(21) Appl. No.: 16/467,264

(22) PCT Filed: Dec. 6, 2017

(86) PCT No.: PCT/EP2017/081619
§ 371 (c)(1),
(2) Date: Jun. 6, 2019

(87) PCT Pub. No.: WO2018/104360
PCT Pub. Date: Jun. 14, 2018

(65) Prior Publication Data
US 2019/0366883 A1 Dec. 5, 2019

(30) Foreign Application Priority Data
Dec. 9, 2016 (DE) .......................... 10 2016 224 625

(51) Int. Cl.
*B60N 2/22* (2006.01)
*B60N 2/30* (2006.01)
(Continued)

(52) U.S. Cl.
CPC ............. *B60N 2/22* (2013.01); *B60N 2/3013* (2013.01); *B60N 2/686* (2013.01); *B60N 2/7094* (2013.01);
(Continued)

(58) Field of Classification Search
CPC ........ B60N 2/686; B60N 2/7094; B60N 2/22; B60N 2/3013
See application file for complete search history.

(56) References Cited

U.S. PATENT DOCUMENTS

| 6,454,354 B1 | 9/2002 | Vossmann et al. |
| 6,619,743 B1 | 9/2003 | Scholz et al. |

(Continued)

FOREIGN PATENT DOCUMENTS

| DE | 4405653 A1 | 8/1994 |
| DE | 19841363 C1 | 4/2000 |

(Continued)

Primary Examiner — Anthony D Barfield
(74) Attorney, Agent, or Firm — Brooks Kushman, P.C.

(57) ABSTRACT

A vehicle seat having a seat subframe, a cushion carrier for a seat part of the vehicle seat, wherein the cushion carrier is adjustably mounted on the seat subframe in order to lower at least one section of the cushion carrier, and a backrest which can be pivoted, relative to the seat subframe, in a comfort region for adjustment of a usage position of the backrest and in a transition region outside of the comfort region toward the cushion carrier into a loading position, wherein there is a locking mechanism which, during adjustment of the backrest in the comfort region, locks the cushion carrier against adjustment and permits adjustment of the cushion carrier by the adjustment of the backrest when the backrest is pivoted beyond the comfort region toward the loading position.

18 Claims, 17 Drawing Sheets

(51) Int. Cl.
*B60N 2/68* (2006.01)
*B60N 2/70* (2006.01)
*B60N 2/02* (2006.01)

(52) U.S. Cl.
CPC ...... *B60N 2/3065* (2013.01); *B60N 2002/024* (2013.01)

(56) References Cited

U.S. PATENT DOCUMENTS

| | | |
|---|---|---|
| 2005/0110323 A1 | 5/2005 | Hofmann et al. |
| 2006/0145524 A1 | 7/2006 | Fischer et al. |
| 2009/0167046 A1 | 7/2009 | Yamagishi |
| 2009/0167068 A1 | 7/2009 | Yamagishi |
| 2013/0057041 A1* | 3/2013 | Ngiau ............ B60N 2/12 297/354.12 |
| 2015/0061339 A1 | 3/2015 | Perrin et al. |

FOREIGN PATENT DOCUMENTS

| | | |
|---|---|---|
| DE | 19957380 C1 | 3/2001 |
| DE | 10123776 A1 | 11/2002 |
| DE | 10227945 A1 | 1/2004 |
| DE | 19938666 B4 | 7/2004 |
| DE | 20304713 U1 | 9/2004 |
| DE | 10317238 A1 | 10/2004 |
| DE | 102006004497 A1 | 8/2007 |
| DE | 102006022800 A1 | 11/2007 |
| DE | 102007012429 A1 | 9/2008 |
| DE | 102008063616 A1 | 7/2009 |
| DE | 102008063617 A1 | 7/2009 |
| DE | 102009007051 B3 | 5/2010 |
| DE | 112011104472 T5 | 9/2013 |
| DE | 102013211495 A1 | 12/2014 |
| DE | 102014216935 A1 | 3/2015 |
| DE | 102013225123 A1 | 6/2015 |
| DE | 102014214563 A1 | 11/2015 |
| DE | 102014214564 A1 | 11/2015 |
| EP | 0985575 B1 | 6/2004 |
| EP | 1533177 A2 | 5/2005 |
| EP | 1535792 A2 | 6/2005 |
| WO | 0044582 A1 | 8/2000 |
| WO | 2004082984 A1 | 9/2004 |
| WO | 2007031336 A2 | 3/2007 |
| WO | 2007124729 A1 | 11/2007 |
| WO | 2012085469 A1 | 6/2012 |
| WO | 2015082672 A1 | 6/2015 |

* cited by examiner

VEHICLE SEAT HAVING A LOCKING MECHANISM FOR LOCKING A CUSHION CARRIER, WHICH CAN BE LOWERED AT LEAST IN SECTIONS, DURING AN ADJUSTMENT OF A BACKREST

CROSS-REFERENCE TO RELATED APPLICATIONS

This application is the U.S. National Phase of PCT/EP2017/081619 filed Dec. 6, 2017, which claims priority to DE 10 2016 224 625.9 filed Dec. 9, 2016, the disclosures of which are hereby incorporated in their entirety by reference herein.

TECHNICAL FIELD

The present disclosure relates to a vehicle seat.

BACKGROUND

A vehicle seat may include a cushion carrier, which is mounted adjustably thereon, for a seat part of the vehicle seat, and a pivotable backrest. The backrest can be pivotable here forward in the direction of the seat part into a loading position, for example in order to enlarge a loading space. It is known, in such a vehicle seat, which is conventionally provided for the second or third seat row of a motor vehicle, to lower the cushion carrier at least in sections during the pivoting of the backrest into the loading position, in order to be able to fold the vehicle seat as flat as possible in the loading positions of the backrest.

In practice, coupling of the backrest to the cushion carrier is frequently provided in such a manner that pivoting of the backrest forward in the direction of the seat part directly leads to lowering of the cushion carrier. However, such a coupling is not desirable in the case of vehicle seats with backrests which are adjustable in their inclination. The cushion carrier is intended to remain here in an adjusted adjustment position as long as the backrest is adjusted relative to the seat underframe only in a comfort region in order to adjust a use position. Only during an adjustment of the backrest beyond such a comfort region in the direction of a loading position is lowering of the cushion carrier also intended to take place.

SUMMARY

The present disclosure may provide one or more solutions to one or more objects by providing a vehicle seat that may include a cushion carrier that may be lowered at least in sections, and a pivotable backrest.

In this connection, a vehicle seat according to the to one or more embodiments may include a locking mechanism with at least one locking element assembly which may include an adjustable locking element coupled to the backrest and a transmission element which is mounted pivotably about a pivot axis. The transmission element has a slotted guide for the locking element and, during pivoting about its pivot axis, leads to an adjustment of the cushion carrier. During an adjustment of the backrest in the comfort region, the locking element is adjustable along the slotted guide of the transmission element and locks the transmission element against pivoting about its pivot axis. During an adjustment of the backrest in the transition region and therefore beyond the comfort region in the direction of the loading position, the locking element, by contrast, is pivotable together with the transmission element about the pivot axis in order thereby to bring about an adjustment of the cushion carrier.

The locking element of the solution according to one or more embodiments, may be adjusted both during an adjustment of the backrest in the comfort region and during an adjustment of the backrest in the transition region, and therefore a complicated decoupling of the locking element is not necessary in order to prevent an undesired adjustment of the cushion carrier in the comfort region of the backrest. A separate lock for locking the cushion carrier that has to be actuated when the backrest is folded forward in the direction of the loading position in order to permit an adjustment of the cushion carrier is also unnecessary (but can, of course, additionally likewise be provided). On the contrary, what is crucial in the locking mechanism provided according to the present disclosure is an adjustment path predetermined differently for the locking element depending on the position of the backrest, and therefore a degree of freedom as to whether the cushion carrier is locked or is likewise adjustable. If the backrest is adjusted into the transition region in the direction of the loading position, the locking mechanism automatically releases the cushion carrier and transmits an adjustment force, which is initiated by the adjustment of the backrest, into the transmission element in order to lower the cushion carrier at least in sections.

The locking element of the locking mechanism may be adjustable here both in the comfort region of the backrest and in the transition region of the backrest. However, different adjustment paths are predetermined here for the locking element, and therefore the cushion carrier is locked via the locking element against an adjustment in the comfort region of the backrest and the locking element permits the adjustment of the cushion carrier only during an adjustment of the backrest beyond the comfort region in the direction of the loading position. An adjustment force for pivoting the transmission element and therefore for adjusting the cushion carrier may in principle also be transmitted here via the locking element in the transition region of the backrest, and therefore, in addition to a locking function in the comfort region of the backrest, the locking element also takes on a function during the transmission of an adjustment force in the transition region of the backrest.

One or more solutions according to the present disclosure may be independent of whether the backrest is actuated by an external force or is pivotable manually. Since the locking and release of the cushion carrier is dependent merely on the adjustment position of the backrest, the manner in which an adjustment force for pivoting the backrest is introduced is not crucial.

The pivotable transmission element of the locking mechanism is typically mounted on a seat underframe, for example on one of two opposite side parts of the seat underframe.

In one exemplary embodiment, the locking element which is coupled to the backrest interacts with a guide element which locks the locking element against pivoting about the pivot axis of the transmission element when the backrest is pivoted in the comfort region. By means of the locking section, the locking element—and thereby the transmission element which is coupled thereto—is consequently locked against pivoting about the pivot axis. The guide element is fixed here, for example, in a manner fixed on the seat underframe and, for example, on a side part of the seat underframe.

For locking the locking element against pivoting about the pivot axis, the guide element may have a locking section against which the locking element lies in the comfort region of the backrest. At the same time, however, during an adjustment of the backrest in the comfort region, the locking element is compelled via the locking section to undertake an adjustment movement along the slotted guide of the transmission element. The locking element itself is therefore restricted in its adjustability via the guide element and, in the comfort region of the backrest, is merely displaceable along the slotted guide of the transmission element. The guide element therefore does indeed permit via its locking section an adjustment movement of the locking element when the backrest is pivoted in its comfort region. However, the guide element restricts the degree of freedom of the locking element, and therefore an adjustment force acting on the locking element by the pivoting movement of the backrest leads exclusively to the adjustment of the locking element along the slotted guide of the transmission element, but not to a pivoting movement of the locking element. By this means, the transmission element having the slotted guide for the locking element is then also locked against a pivoting movement about its pivot axis. The transmission element can thus only be pivoted, and therefore the cushion carrier adjusted, if the displaceable locking element held in a positive-locking manner in the slotted guide of the transmission element may carry out a pivoting movement about the pivot axis. The locking element thus keeps the transmission element and therefore the cushion carrier arrested when the backrest is pivoted in the comfort region.

In one variant embodiment, the locking section has a locking slotted guide for the locking element, in which locking slotted guide a section of the locking element is held and displaceable in a positive-locking manner. Consequently, during an adjustment of the backrest in the comfort region, only an adjustment movement along the locking slotted guide is permitted here. In this exemplary embodiment, the locking element is then consequently compelled via the locking slotted guide to undertake an adjustment movement along the slotted guide of the transmission element when the backrest is pivoted in the comfort region.

In this connection, in particular be provided that the slotted guide of the transmission element and the locking slotted guide of the guide element are arranged overlapping each other in the comfort region of the backrest. It is thus provided, for example, that an elongate locking element is guided with a section on the slotted guide of the transmission element and with a section spaced apart therefrom in the locking slotted guide of the guide element. The slotted guide of the transmission element and the locking slotted guide of the guide element lie next to each other here, for example, with respect to a spatial direction running parallel to the pivot axis of the transmission element. By the slotted guide of the transmission element and the locking slotted guide of the guide element being arranged in a manner overlapping each other in the comfort region of the backrest, they form a type of double slotted guide for the locking element, via which permanent locking of the transmission element, and therefore of the cushion carrier, is achieved in the comfort region of the backrest without an adjustment movement of the locking element itself having to be ruled out here.

In one variant embodiment, the locking slotted guide of the guide element is arranged with respect to the slotted guide of the transmission element and is formed with an open end in such a manner that the locking element may be pushed out of the locking slotted guide at the open end when the backrest is pivoted beyond the comfort region in the direction of the loading position. The slotted guide of the transmission element does not preclude shifting of the locking element out of the locking slotted guide of the guide element here. By contrast, the slotted guide of the transmission element is configured and in particular dimensioned in such a manner that the transmission element does not block the locking element against sliding out of the locking slotted guide when the backrest is pivoted beyond the comfort region in the direction of the loading position. The locking slotted guide of the guide element and the slotted guide of the transmission element are then coordinated with each other and arranged with respect to each other in such a manner that, solely by pivoting of the backrest beyond the comfort region in the direction of the loading position, the locking element may be displaced along the slotted guide of the transmission element to such an extent that the locking element no longer engages in the locking slotted guide of the guide element and therefore may be adjusted relative to the locking slotted guide.

The guide element may furthermore have an adjustment section against which the locking element lies in the transition region of the backrest and via which an adjustment movement is predetermined in the locking element, during an adjustment of the backrest beyond the comfort region in the direction of the loading position, said adjustment movement leading to pivoting of the transmission element for the adjustment of the cushion carrier. The adjustment section of the guide element therefore predetermines an adjustment path for the locking element, by means of which a pivoting movement of the backrest beyond the comfort region is converted into an adjustment movement of the locking element about the pivot axis of the transmission element, and therefore the transmission element is carried along by the locking element and is pivoted about its pivot axis. A pivoting movement of the transmission element leads here to an adjustment of the cushion carrier and in particular to the lowering of at least one section of the cushion carrier (in the direction of a base of the vehicle seat and therefore in the direction of a vehicle floor when the vehicle seat is installed as intended).

For this purpose, the adjustment section may have a curved adjustment contour for the locking element, along which the locking element may be shifted by pivoting of the backrest in the transition region. In particular a complex and, for example, multiply curved adjustment contour may be provided here. In one variant embodiment, the adjustment contour of the adjustment section is curved merely once (e.g. concavely) and runs substantially along an arc of a circle.

The locking element is furthermore also guided via the adjustment section during a resetting movement of the backrest from the loading position in the direction of the comfort region. The locking assembly of the locking mechanism is designed here in such a manner that the locking element is only displaced (again) along the slotted guide of the transmission element and enters again into locking engagement with the locking section of the guide element when the backrest has been pivoted into the comfort region. During a resetting movement of the backrest, the locking element therefore slides, for example, along the adjustment contour of the adjustment section and, in the process, carries along the transmission element such that the latter is pivoted in the opposite direction of rotation about its pivot axis in order to raise the cushion carrier again. If the backrest has been pivoted again into its comfort region and is therefore located in one of a plurality of possible use positions relative to the seat underframe, the locking element, during further adjustment of the backrest, passes, again in engagement with the locking section of the guide element, into a locking position. A (further) adjustment of the backrest in the comfort region rearward then leads just to the locking element sliding along the slotted guide of the transmission element.

In one variant embodiment, for the mechanical coupling of the locking element to the backrest, a separate coupling element is provided that is coupled to an element of the backrest—for example to a backrest strut of a frame of the backrest and in particular to a backrest component arranged on the backrest strut—and to the locking element. Accordingly, during a pivoting movement of the backrest, the coupling element is shifted at the same time and thereby introduces an adjustment force into the locking element. As a result of the configuration according to one or more embodiments of the locking mechanism, the adjustment force leads in the comfort region of the backrest to an adjustment of the locking element without canceling locking of the cushion carrier. Only during pivoting of the backrest beyond the comfort region in the direction of the loading position does the adjustment force which is transmitted via the coupling element result in a pivoting movement of the locking element, as a result of which the transmission element is also pivoted about its pivot axis in order to lower the cushion carrier.

In order to transmit an adjustment force for the adjustment of the cushion carrier, the transmission element may be connected to a coupling member for rotation therewith. Such a coupling member may be provided in particular for transmitting the adjustment force from an (outer/inner) side of a side part of the seat underframe to an opposite (inner/outer) side of the side part. Components of the locking element assembly may therefore be arranged on different sides of a side part of the seat underframe and may be connected to one another via the coupling member. Of course, however, the arrangement of components of the locking element assembly on or at different sides of a side part is not compulsory here. However, such an arrangement may be advantageous with regard to construction space.

The coupling member is connected, for example, to a pivot lever for rotation therewith, said pivot lever being coupled to an element of the cushion carrier. The element of the cushion carrier may be formed here integrally with the cushion carrier or may be fastened thereto as a separate component. Via the pivot lever connected to the coupling member for rotation therewith, an adjustment force is introduced into the cushion carrier for lowering at least one section of the cushion carrier when the backrest is pivoted or folded forward into the loading position. The transmission element thus transmits its pivoting movement into the coupling member. The coupling member rotates the pivot lever in turn and therefore leads to a lowering of the cushion carrier.

In particular in this variant embodiment, it may be provided that the cushion carrier is coupled via a plurality of pivot levers in the manner of a four bar linkage in order to be able to lower the cushion carrier completely or by its front section (with respect to a longitudinal axis of the seat). It may be provided here that an adjustment force for adjusting the cushion carrier is only introduced to one of the plurality of pivot levers—when the backrest is pivoted beyond the comfort region.

In one variant embodiment, the locking mechanism of the vehicle seat may include two locking element assemblies, of which a first locking element assembly is provided on a first side part of the seat underframe and a second locking element assembly is provided on a second side part of the seat underframe, said second side part lying opposite the second side part. Consequently, the locking mechanism here may include two locking element assemblies which are provided on different, opposite side parts of the seat underframe.

The first locking element assembly here may include the transmission element which has a slotted guide and is mounted pivotably, for adjusting the cushion carrier. The second locking element assembly may be formed, for example, in a mirror-inverted manner with respect to the first locking element assembly with transmission element and locking element. However, in one exemplary embodiment, the second locking element assembly is configured differently from the first locking element assembly and is designed and provided only for locking the cushion carrier in the comfort region of the backrest, but without transmitting an adjustment force for the adjustment of the cushion carrier when the backrest is pivoted beyond the comfort region into the loading position.

In this connection, the second locking element assembly may include, for example, at least one pivotably mounted latching element that likewise locks the cushion carrier against an adjustment in the comfort region of the backrest by interaction with a locking element of the second locking element assembly, and by pivoting of the backrest beyond the comfort region in the direction of the loading position is pivotable in order to cancel a locking via the second locking element assembly.

The locking element of the second locking element assembly is fixed, for example, to a pivot lever which, firstly, is coupled pivotably about a first pivot axis to an element of the seat underframe and, secondly, is coupled pivotably about a second pivot axis to an element of the cushion carrier. In the comfort region of the backrest, the latching element is latched to the locking element, which is fixed to said pivot lever, of the second locking element assembly, and therefore the pivot lever is locked against pivoting about the first pivot axis. For the latching to the locking element, the latching element has, for example, a hook section. A positive-locking connection to the locking element is provided via said hook section, said connection being releasable by pivoting the latching element.

The latching element can be elastically prestressed by means of at least one spring element into a latching position in which the latching element and the locking element of the second locking element assembly are in engagement. By means of the at least one spring element, a prestressing force is therefore exerted on the latching element, by means of which prestressing force the latching element automatically resumes a latching position if a sufficiently high adjustment force no longer acts on the latching element, in particular if the backrest has been pivoted back again out of the loading position into the comfort region and the cushion carrier has been raised again.

In order to actuate the latching element of the second locking element assembly, in one variant embodiment the second locking element assembly has at least one flexible traction means, for example in the form of a Bowden cable or a plurality of Bowden cables. By means of the flexible traction means, during the pivoting of the backrest beyond the comfort region in the direction of the loading position, an adjustment force can be transmitted here to the latching element in order to pivot the latching element into a release position in which locking of the cushion carrier via the second locking element assembly is cancelled. The traction means can be fixed here by one end to an element of the backrest such that a pivoting movement of the backrest is converted into a tensile force in the flexible traction means, said tensile force leading, during pivoting of the backrest in the direction of the loading position and beyond the comfort region, to pivoting of the latching element into its release position.

In a development based thereon, the securing of the traction means to an element of the backrest is provided in the region of a longitudinal side of the vehicle seat, on which longitudinal side the first locking element assembly with the pivotable transmission element is also located. If the second locking element assembly is located on the other longitudinal side of the vehicle seat, transmission of the adjustment force to the second locking element assembly via the flexible traction means is ensured, wherein, owing to the flexibility of the traction means, the latter can easily be transferred along the seat underframe to the other longitudinal side.

In one variant embodiment, the second locking element assembly may include at least one (lifting) compensation means via which pulling on the traction means during an adjustment of the backrest in the comfort region in the direction of the loading position is compensated for. Pivoting of the latching element in order to cancel the locking of the cushion carrier thus takes place only during an adjustment of the backrest beyond the comfort region. By means of the at least one (lifting) combination means, for example in the form of a lifting compensator, pulling on the traction means in the comfort region is thus compensated for. Only if the backrest is adjusted beyond the comfort region in the direction of the loading position is a (sufficiently high) adjustment force transmitted to the latching element in order to cancel locking via the second locking element assembly.

In the case of a locking mechanism having first and second locking element assemblies, use can be made in particular of a variant embodiment in which the first locking element assembly is provided on what is referred to as the door side of the vehicle seat while the second locking element assembly is provided on what is referred to as the tunnel side of the vehicle seat. The two, the first and second, locking element assemblies lock the cushion carrier against an adjustment as long as the backrest is pivoted in its comfort region in order to adjust different use positions in which a user can sit as intended on the vehicle seat. If, by contrast, the backrest is pivoted beyond the comfort region in the direction of a loading position, the locking via the two locking element assemblies on the door side and on the tunnel side is canceled separately. Furthermore, via one of the locking element assemblies, namely the first locking element assembly, an adjustment force produced by the pivoting movement of the backrest is converted into an adjustment of the cushion carrier, in order to lower the latter. If the backrest is pivoted back again into a use position, the cushion carrier is likewise raised again into a use position and is arrested therein (in a crash-proof manner) via the two locking element assemblies of the locking mechanism on the tunnel side and on the door side.

BRIEF DESCRIPTION OF THE DRAWINGS

The attached figures illustrate possible variant embodiments of the invention by way of example.

In the figures.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

As one example, DE 10 2014 214 563 A1 provides a vehicle seat with a coupling mechanism through that the backrest and the cushion carrier are decoupled from each other when the backrest is adjusted in a comfort region. Only during an adjustment of the backrest beyond the comfort region in the direction of a loading position does a mechanical coupling between the backrest and the cushion carrier take place in order to lower the cushion carrier during further pivoting of the backrest in the direction of the loading position.

Furthermore, it is known to provide a locking mechanism having at least one lock on the vehicle seat. During an adjustment of the backrest in the comfort region, the cushion carrier is locked via the lock against an adjustment. Such a lock is actuated manually when the backrest is intended to be pivoted or folded forward into the loading position, and therefore the cushion carrier is lowered during the subsequent folding forward of the backrest. However, a locking mechanism with an additional lock of this type takes up a comparatively large amount of construction space and is generally also highly complex.

Figure 13A:
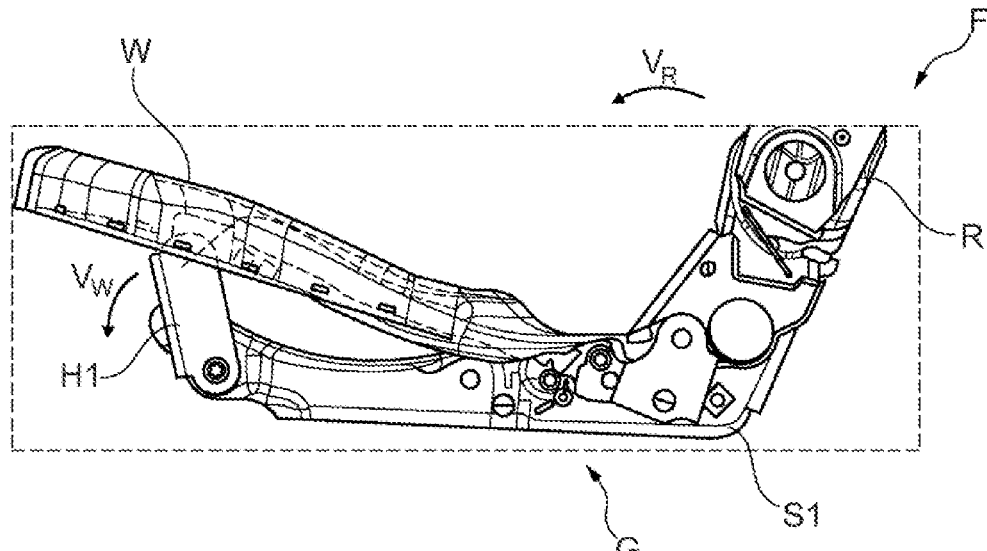
FIGS. 13A-13B show a vehicle seat known from the prior art having a cushion carrier which can be at least partly lowered when a backrest is folded forward.
Figure 13B:
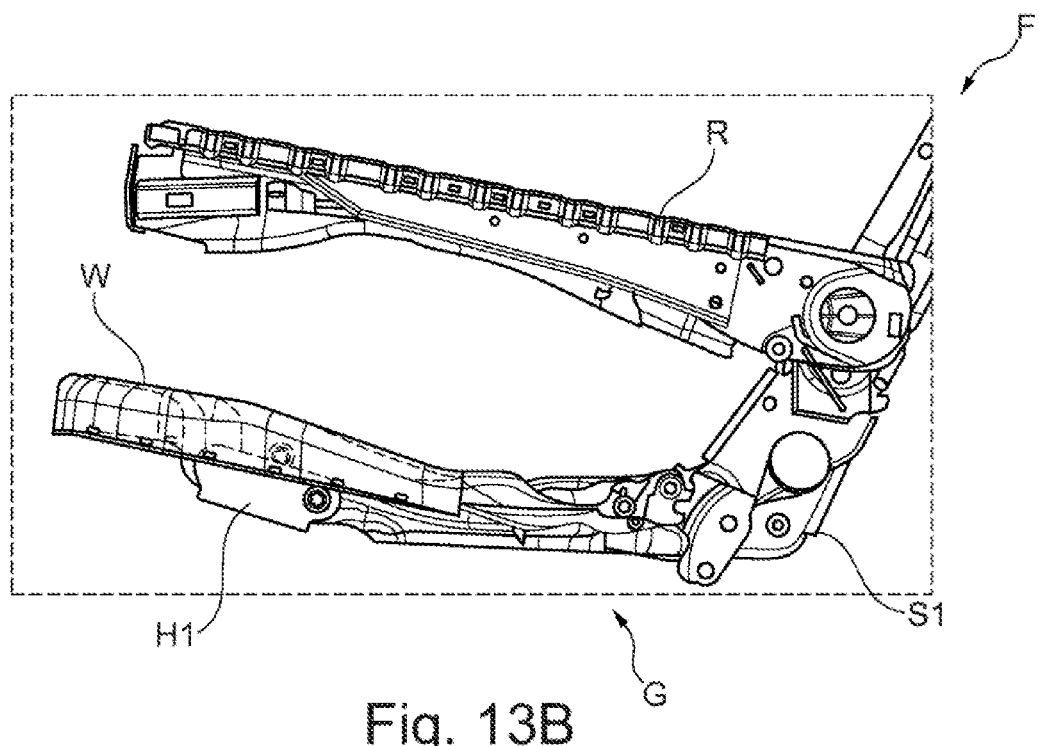

FIGS. 13A and 13B show, in a corresponding side view, in each case part of a vehicle seat F which is known from the prior art and has a seat underframe G, a cushion carrier mounted adjustably on the seat underframe G in the form of a seat pan W and a backrest R mounted pivotably relative to the seat underframe G. The backrest R is pivotable or foldable from a use position, illustrated in FIG. 13A, about a pivot axis along an adjustment direction $V_R$ onto the seat pan W into a loading position. The backrest R is coupled here to the seat pan W in such a manner that the seat pan W is lowered by its front region during the folding of the backrest R forward. The seat pan W is coupled here in the front region to the seat underframe G via a plurality of pivot levers. Of said pivot levers, only one pivot lever H1 is illustrated in the side views of FIGS. 13A and 13B, said pivot lever being coupled firstly to the seat pan W and secondly to a side part S1 of the seat underframe G. If the backrest R is pivoted from the use position into the loading position, the pivot lever H1 also pivots about its pivot axis on the side part S1 along an adjustment direction $V_W$ (in the clockwise direction in FIG. 13A), as a result of which the front section of the seat pan W is lowered.

So that the seat pan W is not shifted unintentionally and in particular in an undesired manner in the event of a crash, it is locked against an adjustment when the backrest R is not folded into the loading position as intended. The vehicle seat F illustrated in FIGS. 13A and 13B is provided, for example, for the second or third seat row of a motor vehicle. In the variant illustrated, an inclination adjustment of the backrest R relative to the seat underframe G is not provided. An adjustment movement of the backrest R can therefore be directly coupled to the adjustment movement of the seat pan W, and therefore a pivoting movement of the backrest R also leads directly to an adjustment movement of the seat pan W (firstly for lowering the seat pan W when the backrest R is folded forward or secondly for raising same when the backrest R is pivoted back). An adjustment of the inclination of the backrest relative to the seat underframe G is therefore not provided here.

By contrast, a vehicle seat F according to the present disclosure permits a pivoting movement of a backrest R of a vehicle seat F in a comfort region in order to adjust different use positions of the backrest R relative to a seat underframe G, wherein a cushion carrier in the form of a seat pan W remains locked (in a crash-proof manner) against an adjustment. Only in the event of an adjustment of the backrest R beyond the comfort region in the direction of a folded-forward loading position is the locking of the seat pan W released and the seat pan W shifted forward and lowered by the further pivoting of the backrest R.

In the case of the vehicle seat F illustrated in different views in FIGS. 1 to 12, the backrest R of the vehicle seat F is mounted on a seat underframe G so as to be pivotable about a pivot axis A. The pivotable mounting of the backrest R takes place here in particular on side parts S1 and S2 of the seat underframe G, which side parts extend along a seat longitudinal direction L and are arranged lying opposite each other. The side part S1 here defines what is referred to as the door side of the vehicle seat F while the other, opposite side part S2 defines what is referred to as the tunnel side of the vehicle seat F. The two side parts S1 and S2 are mounted displaceably in the longitudinal direction L of the seat via a rail arrangement SA and are rigidly connected to each other in the region of the backrest R via a rear transverse shaft or a transverse tube Q.

For the definition of a seat surface, the vehicle seat F has a cushion carrier which is arranged on the seat underframe G and is in the form of a seat pan W. A seat cushion on which a seat user can sit is to be fastened as intended to said seat pan W. The seat pan W is mounted adjustably here on the seat underframe G via a four bar linkage kinematic arrangement having a plurality of pivot levers H1 to H5 such that the seat pan W can be lowered from the use position, illustrated, for example, in FIG. 1, into a loading position. The seat pan W is lowered here especially in its front region (as seen in the longitudinal direction L of the seat) when the backrest R is pivoted or folded forward about the pivot axis A onto the seat pan W such that the backrest R takes up a loading position via which, for example, a loading space is enlarged. The vehicle seat F is thus provided, for example, for a second or third seat row of a motor vehicle.

In order to increase the comfort, the backrest R of the vehicle seat F illustrated is also adjustable here in its inclination with respect to the pivot axis A in a comfort region. However, a pivoting movement of the backrest R is not intended to lead here to an adjustment of the seat pan W relative to the seat underframe G. For this purpose, a lock-free locking mechanism 1 is provided here.

Said locking mechanism 1 firstly arrests the seat pan W relative to the seat underframe G and locks the seat pan W against an adjustment as long as the backrest R is only pivoted about the pivot axis A in the comfort region in order to set different use positions. If, however, the backrest R is pivoted forward about the pivot axis A beyond said comfort region onto the seat pan W in the direction of a loading position, the locking mechanism 1 cancels the locking of the seat pan W by simple further pivoting of the backrest R forward and transmits an adjustment force for lowering the seat pan W to one of the pivot levers H1 to H5. For this purpose, the locking mechanism 1 should neither be actuated separately nor does the locking mechanism 1 have an independent drive for adjusting the seat pan W. On the contrary, during pivoting of the backrest R beyond its comfort region, the locking mechanism 1 converts an adjustment force resulting from the pivoting movement of the backrest R into an adjustment movement of the seat pan W. The vehicle seat F illustrated thus also only has a driving device for the adjustment of the backrest R in a manner actuated by external force. For example, an electric motor part is part of said driving device.

The seat pan W illustrated on an enlarged scale in FIGS. 2A-2B and 3A-3B is mounted pivotably on the seat underframe G and in particular on the side parts S1 and S2 via a plurality of pivot levers H1 to H5. Two front pivot levers H1 and H2 are coupled here to a side part S1 or S2 or to a bearing shaft LW fixed rigidly to the seat pan W on the lower side thereof. Said bearing shaft LW is fixed to the lower side of the seat pan W via holding sockets BU1, BU2 and BU3.

In the rear region in the vicinity of the rear transverse shaft Q, the seat pan W is furthermore connected to the seat underframe G via further pivot levers (three here) H3, H4 and H5. A rear, tunnel-side pivot lever H3 is coupled here to a connecting element in the form of a connecting tab LL3 of the seat pan W. Said connecting tab LL3 is designed as a separate component and is connected rigidly to the seat pan W or is formed integrally therewith. A rear, door-side pivot lever H5 is provided on the opposite door side, said pivot lever H5 being coupled to a further connecting tab LL5 of the seat pan W via a connecting region VW. A further pivot lever H4 is provided between said two tunnel-side and door-side pivot levers H3 and H5. Said further pivot lever Hartz IV is coupled to a further connecting tab LL4. While the front tunnel-side and door-side pivot levers H1 and H2 and also the rear tunnel-side and door-side pivot levers H3 and H5 are each also coupled to one of the side parts S1, S2, the further (central) pivot lever H4 between the two side parts S1 and S2 is mounted on a central part M fixed to the seat underframe.

For the coupling, the individual pivot levers H1-H5 have different bearing openings O1a, O1b, O2a, O2b, O3b, O4a. For example, the front pivot levers H1 and H2 each have a (first) bearing opening O1a or O2a for the coupling to an assigned side part S1 or S2, for example by means of a bolt, and a further (second) bearing opening O1b, O2b for the positive-locking connection to the bearing shaft LW. The respective rear pivot lever H3 or H4 is correspondingly coupled to the (tunnel-side) side part S2 or to the central part M via the bearing openings O3a and O4a.

By contrast, the rear, door-side pivot lever H5 has a connecting opening O5a for its pivotable mounting on the door-side side part S1, via which the rear, door-side pivot lever H5 is connected to a coupling member in the form of a coupling shaft KW in a positive-locking manner and for rotation therewith. Via said coupling shaft KW, a torque is introduced via the locking mechanism 1 when the backrest R is folded forward into its loading position, and therefore the seat pan W is driven to perform an adjustment movement which leads to the seat pan W being shifted forward and being lowered. When the backrest R is reset from the loading position into a use position, a torque is introduced conversely in turn via the coupling shaft KW into the rear, door-side pivot lever H5 in order to raise the seat pan W. The crankshaft KW for this purpose is part of a first locking element assembly 2a of the locking mechanism 1 and connects its components provided on an outer side S1A of the side part S1 to the rear, door-side pivot lever H5 arranged on an opposite inner side S1B of the side part S1.

Figure 1:
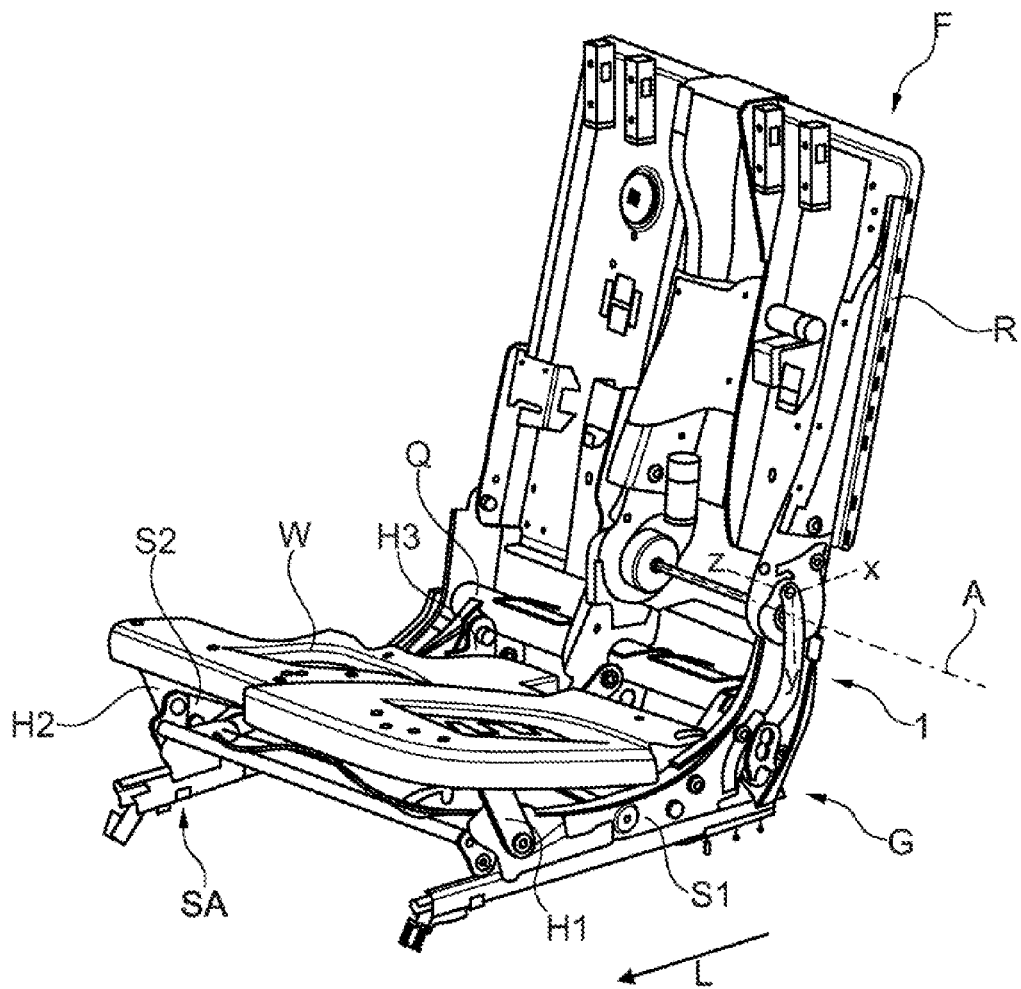
FIG. 1 shows a perspective view of a vehicle seat with a locking mechanism according to one or more embodiments.
Figure 2A:
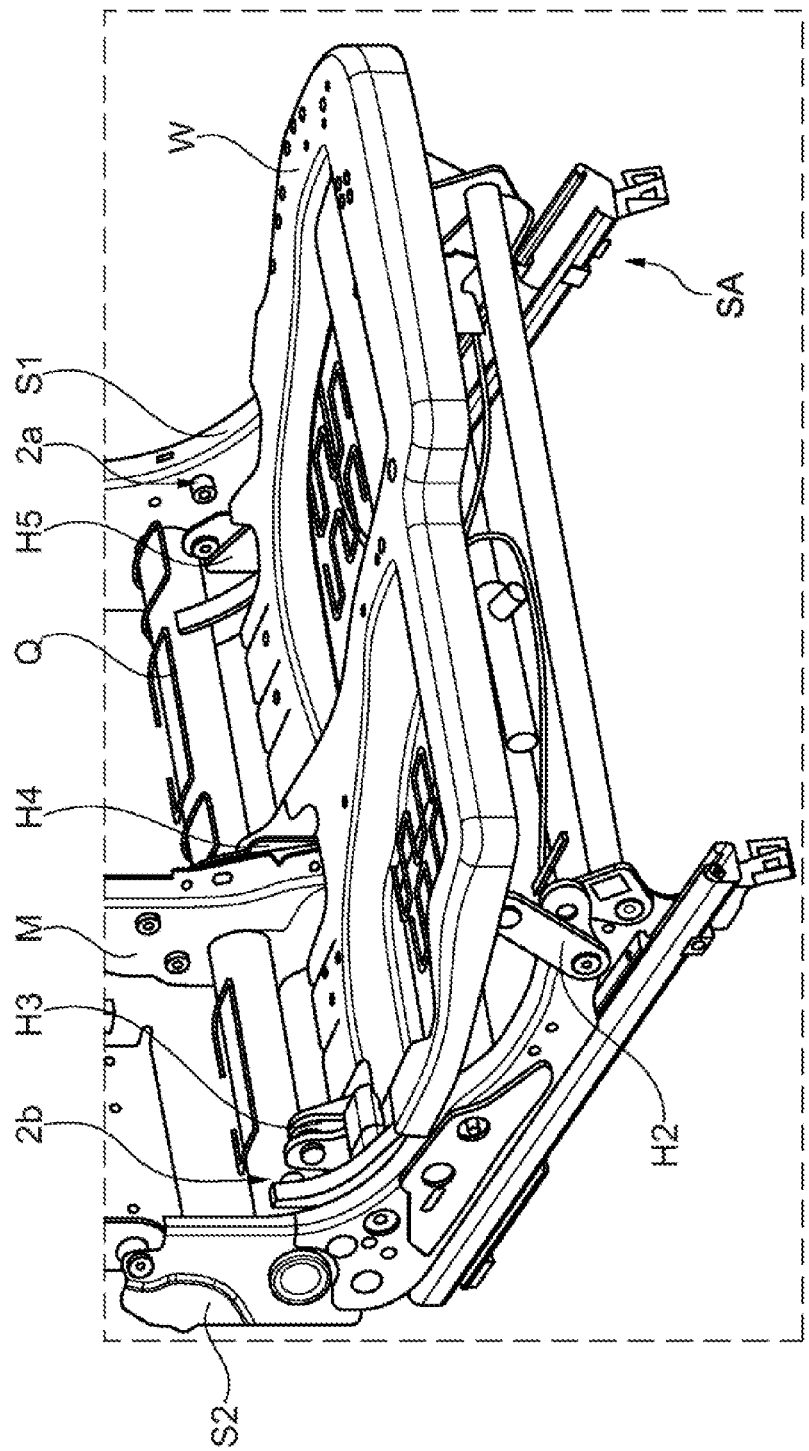
FIG. 2A-2B shows part of the vehicle seat from FIG. 1 looking at a seat underframe of the vehicle seat in different views.
Figure 2B:
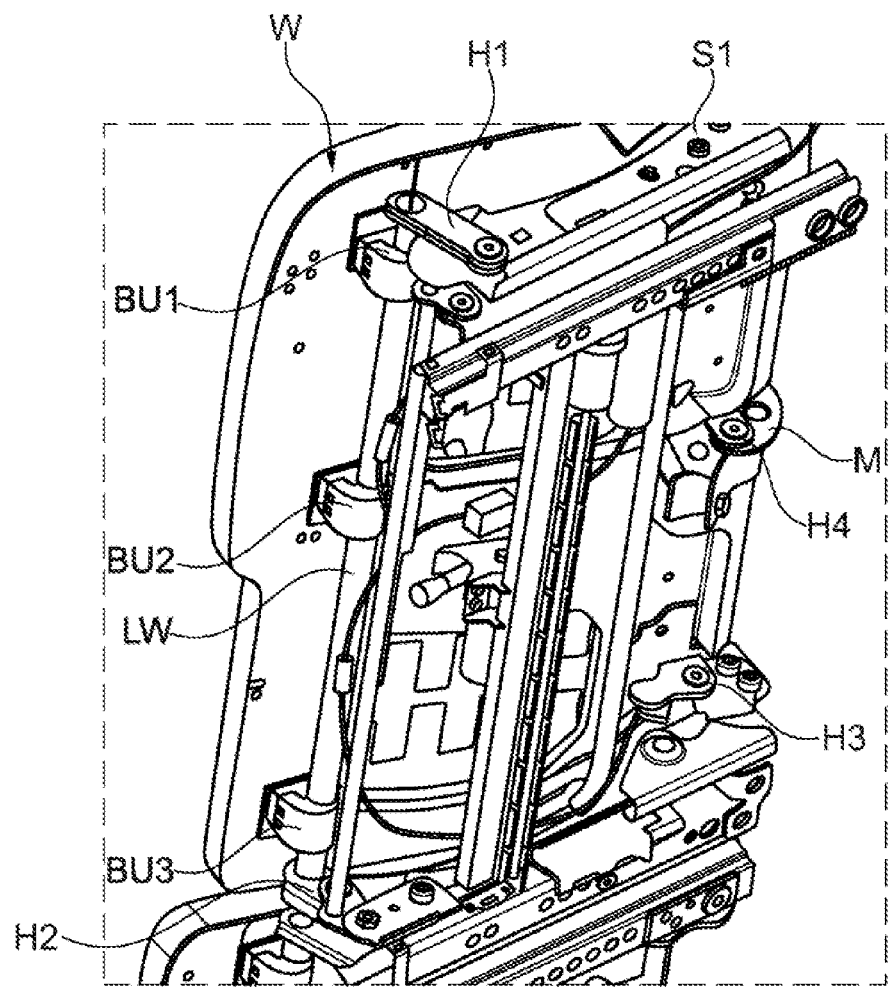
Figure 3A:
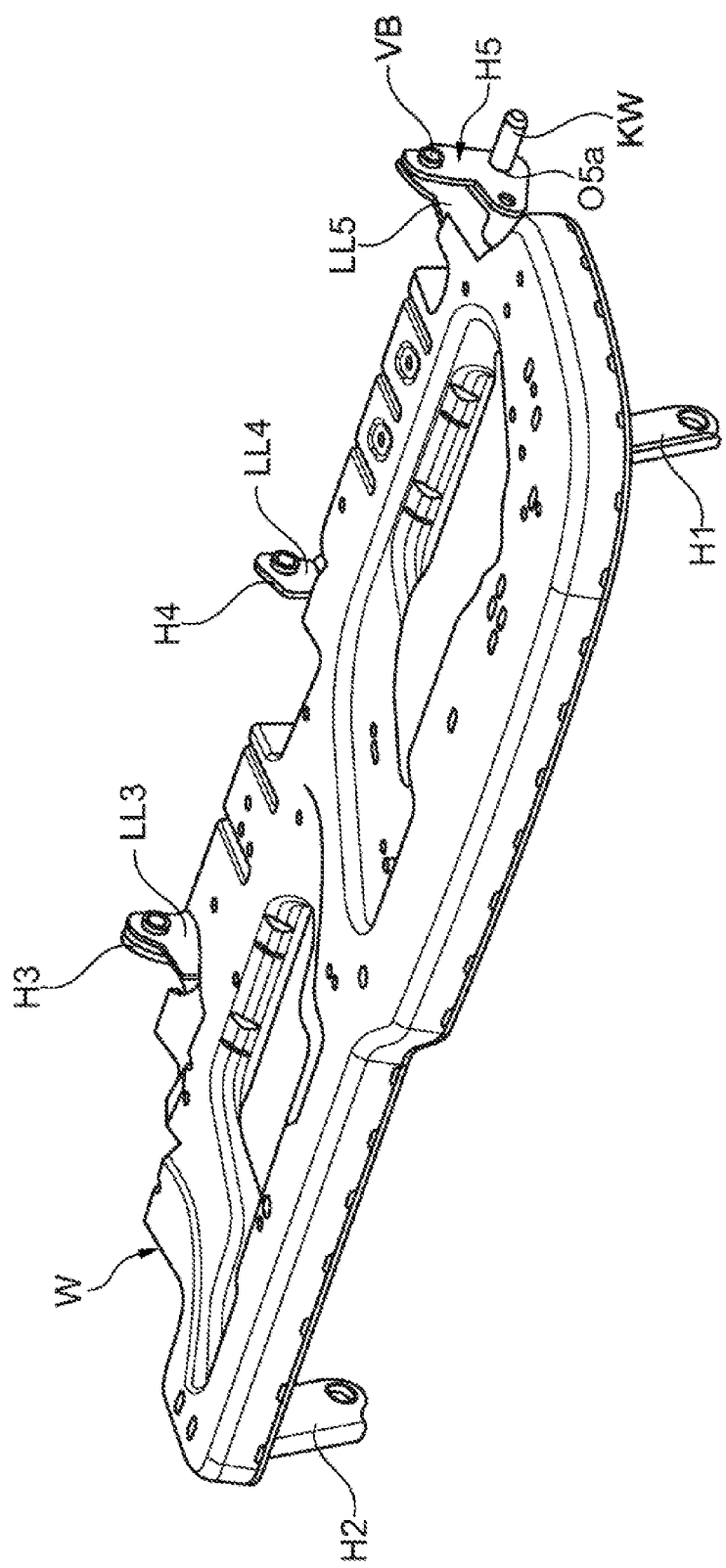
FIGS. 3A-3B show different perspective views of a cushion carrier of the vehicle seat from FIG. 1.
Figure 3B:
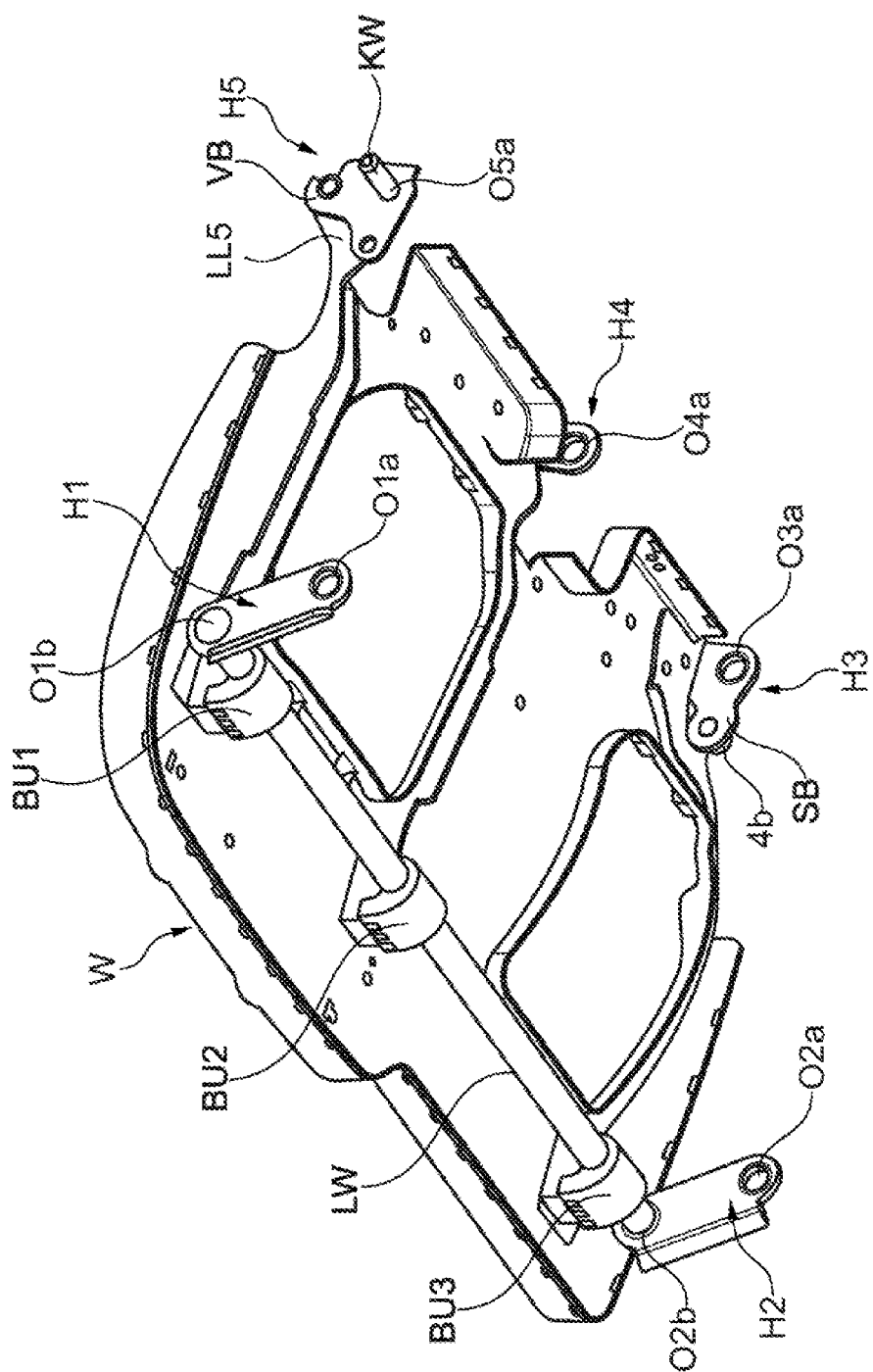
Figure 4A:
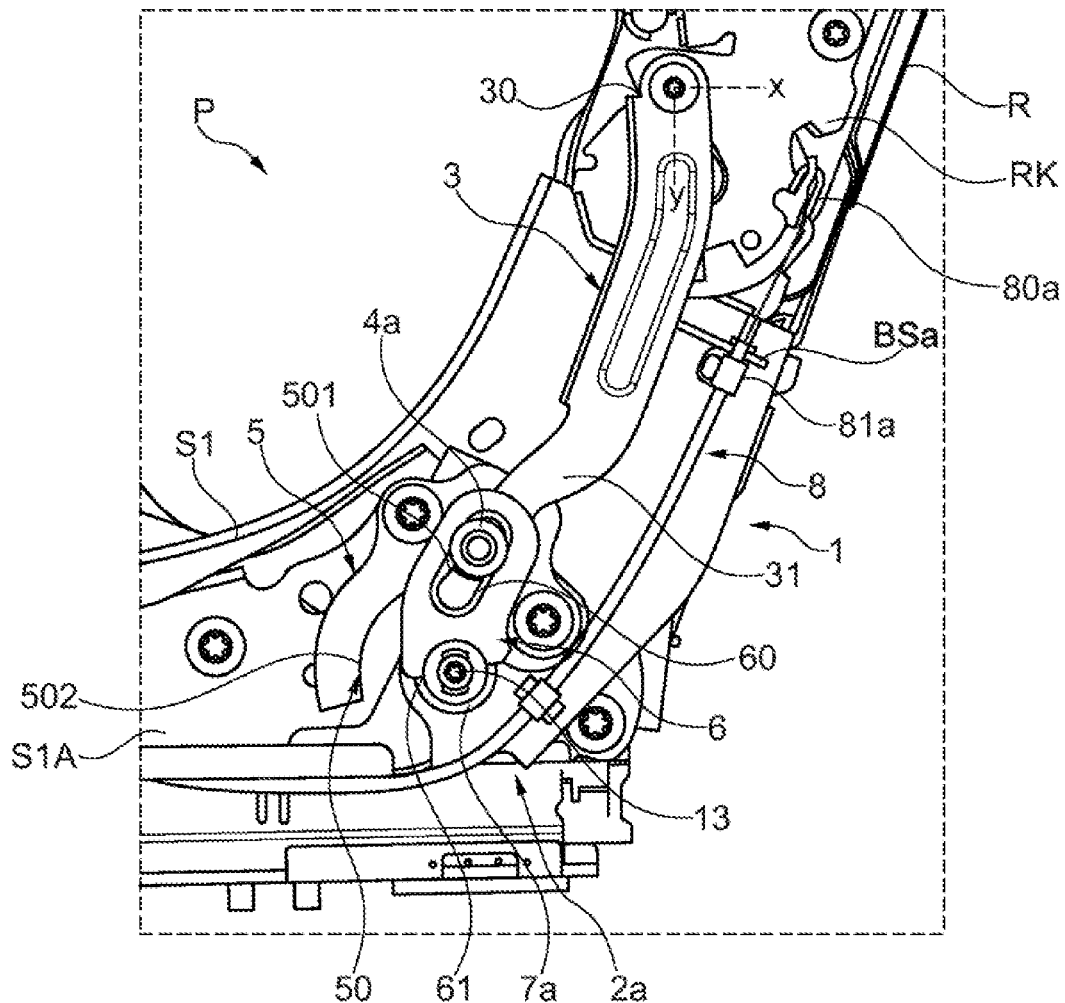
FIGS. 4A-4C show, in corresponding side views, various phases during folding of the backrest of the vehicle seat from FIG. 1 forward from a use position into a loading position and the associated lowering of a cushion carrier with the aid of the locking mechanism.
Figure 4B:
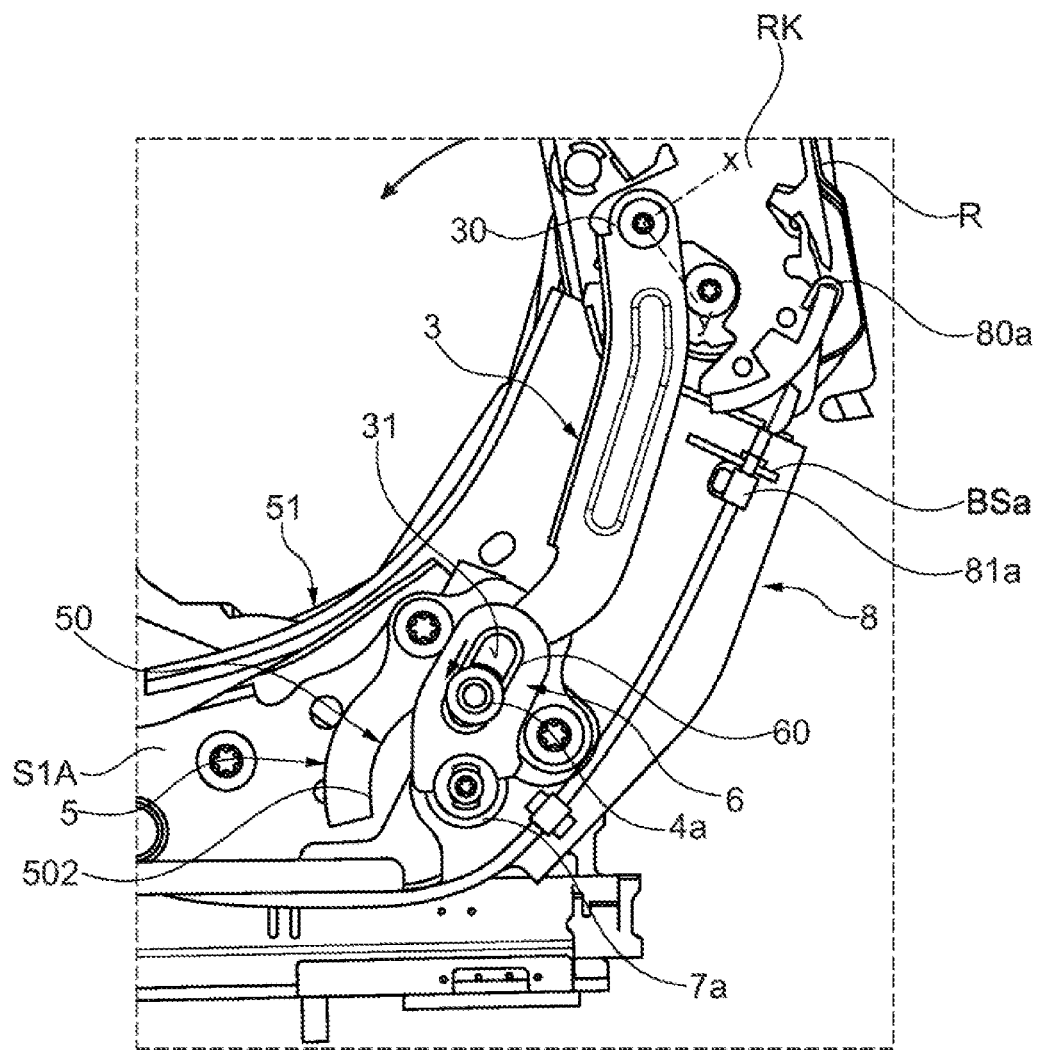
Figure 4C:
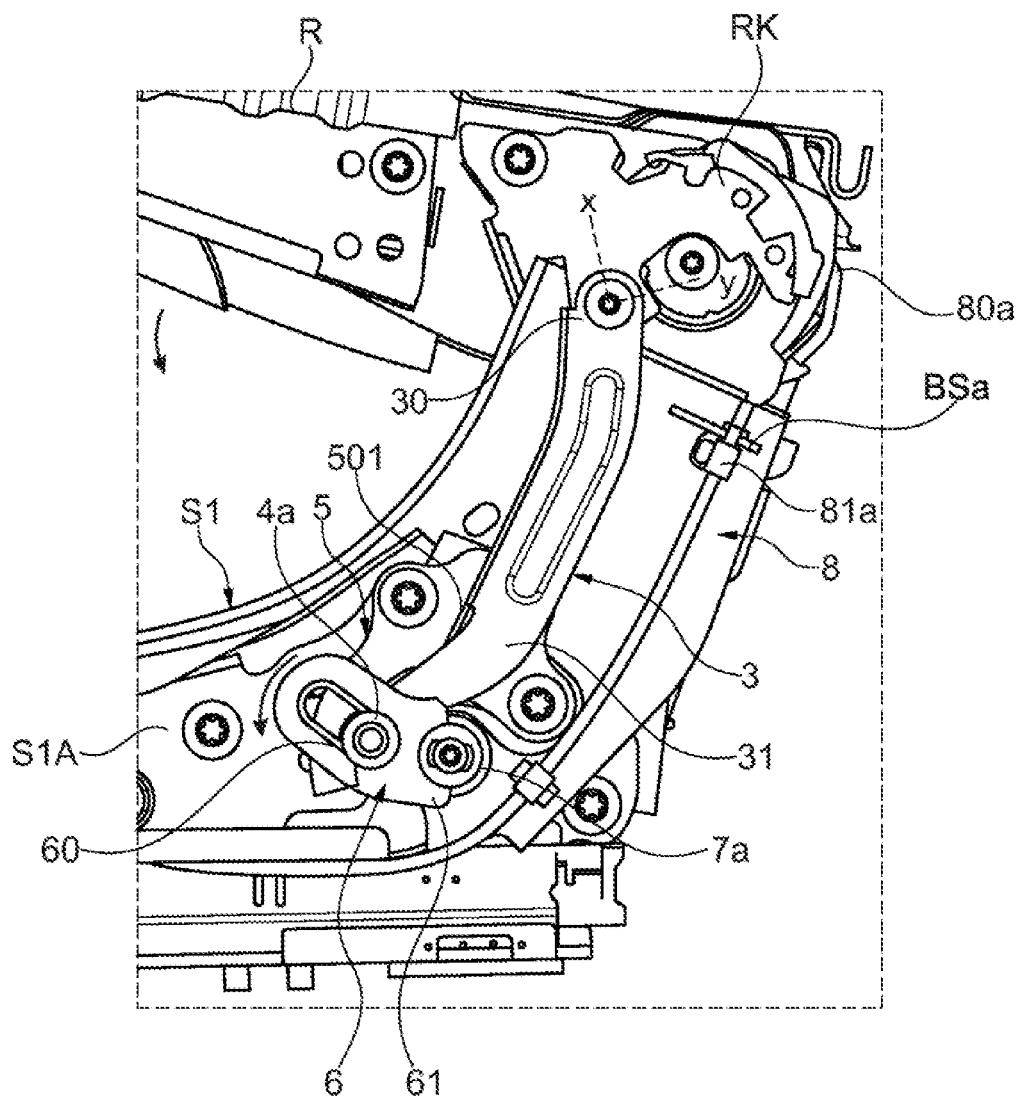

FIGS. 4A, 4B and 4C illustrate folding of the backrest R forward into the loading position in different phases. FIGS. 5, 6, 7A-7B, 8 and 9 illustrate, in an overall view, details of a first door-side locking element assembly 2a of the locking mechanism 1. On the outer side S1A of the first side part S1, the first (door-side) locking element assembly 2a has a transmission element in the form of a transmission lever 6 connected to a coupling shaft KW via a connecting sleeve 7a for rotation with said coupling shaft. If said transmission lever 6 is pivoted about a pivot axis B defined by the coupling shaft KW, a corresponding torque is transmitted to the rear, door-side pivot lever H5 and drives the seat pan W to perform an adjustment movement.

In order, however, to lock the seat pan W here in a crash-proof manner in the different use positions of the backrest R, in which a seat user is intended to sit as intended on the vehicle seat F, the door-side locking element assembly 2a has a locking element 4a. Said locking element 4a is defined here by a locking bolt 41a and a sliding nut 40a fastened thereto (compare in particular the sectional illustration of FIG. 9). Via said locking element 4a, the transmission lever 6 is arrested and therefore the seat pan W is locked (in a crash-proof manner) against an adjustment as long as the backrest R is only pivoted about the pivot axis A in its comfort region relative to the seat underframe G. Furthermore, the locking element 4a serves for introducing an adjustment force into the transmission lever 6 in order, when the backrest R is folded forward about its pivot axis A into the loading position, to pivot the transmission lever 6 in the one direction of rotation and therefore to lower the seat pan W and also, when the backrest R is folded back, to pivot the transmission lever 6 in the opposite direction of rotation and therefore to raise the seat pan W.

In order to couple a pivoting movement of the backrest R to an adjustment movement of the locking element 4a, the locking element 4a is connected to a coupling element in the form of a coupling rod 3. The coupling rod 3 is coupled in the vicinity of the pivot axis A by one rod end 30 to a backrest component RK fixed on the backrest. The coupling rod 3 is coupled by a further rod end 31 to the locking bolt 41a of the locking element 4a. The locking element 4a is furthermore held in a positive-locking and displaceable manner via a (first) section—in the region of its sliding nut 40a—in a slotted guide 60 in the form of an elongated hole in the transmission lever 6. At the same time, the locking element 4a is held in a positive-locking manner via another (second) section—in the region of its locking bolt 41a—in a locking slotted guide 5010 of a guide element 5 fixed on the seat underframe.

In the comfort region of the backrest R, the two slotted guides 60 and 5010 of the transmission lever 6, on the one hand, and of the guide element 5, on the other hand, are arranged in an overlapping manner with each other. Via the locking slotted guide 5010 which is formed on a locking section 501 of the guide element 5, the locking element 4a is secured against rotation about the pivot axis B of the transmission lever 6 and is displaceable only substantially transversely with respect to said pivot axis B in the slotted guides 60 and 5010 if, as a result of a pivoting movement of the backrest R, an adjustment force is transmitted to the locking element 4a via the coupling rod 3. The locking element 4a is therefore compelled via the locking slotted guide 5010 of the guide element 5 to undertake an adjustment movement along said locking slotted guide 5010 and also along the slotted guide 60 of the transmission lever 6 without the locking element 4a being rotatable about the pivot axis B of the transmission lever 6. By this means, the transmission lever 6 is then also locked against pivoting about the pivot axis B and therefore the seat pan W is secured in its use position. The (lower) rod end 31 of the coupling rod 3 that is connected to the locking element 4a is therefore displaced along the locking slotted guide 5010 and along the slotted guide 60 of the transmission lever 6 without releasing a locking of the seat pan W.

Only if the backrest R is pivoted further forward beyond the comfort region in the direction of the loading position, as is illustrated in FIG. 4B, is the locking of the seat pan W released and a torque introduced into the transmission lever 6 via the coupling rod 3 and the locking element 4a. The locking element 4a is then displaced (downward) here to such an extent that the locking element 4a is no longer in engagement with the locking slotted guide 5010 of the guide element 5. During further pivoting of the backrest R in the direction of the loading position, the guide element 5 therefore no longer acts counter to a pivoting movement of the locking element 4a about the pivot axis B. On the contrary, an adjustment section 502 having a concavely curved adjustment contour 5020 is formed on the guide element 5, the adjustment contour predetermining an adjustment movement for the locking element 4a about the pivot axis B of the transmission lever 6 when the backrest R is located outside the comfort region in a transition region between a loading position folded forward to the maximum and a first use position of the comfort region.

During adjustment along the adjustment contour 5020 of the guide element 5, the locking element 4a carries along the transmission lever 6 via the mounting in the slotted guide 60 of the transmission lever 6 and pivots the latter about its pivot axis B. Said pivoting movement is transmitted via a connecting section 61 of the transmission lever 6 to the connecting sleeve 7a and therefore to the coupling shaft KW such that, on the inner side S1B of the side part S1, the rear, door-side pivot lever H5 is acted upon with a torque and the seat pan W is lowered. The rear, door-side pivot lever H5 then likewise pivots about the pivot axis B and carries along a connecting element here in the form of a connecting bolt VE5, to which the pivot lever H5 is coupled and which is fastened to the connecting tab LL5 of the seat pan W. Driven by the rear, door-side pivot lever H5, the seat pan W is then shifted forward via the individual articulation points of the pivot levers H1 to H5 and lowered.

The seat pan W is therefore locked in a crash-proof manner against an adjustment via the locking element 4a of the first door-side locking element assembly 2a of the locking mechanism 1 when the backrest R is adjusted in its comfort region. Only when the locking element 4a is moved out of the locking slotted guide 5010 of the guide element 5 by further pivoting of the backrest R in the direction of the loading position is the transmission lever 6 no longer locked against pivoting about the pivot axis B, which is defined by the coupling shaft KW, and therefore is an adjustment of the seat pan W possible. During further pivoting of the backrest R, the locking element 4a is no longer compelled to be displaced along the slotted guide 60 of the transmission lever 6, but rather an adjustment path about the pivot axis B is predetermined for the locking element 2 and therefore transmission lever 6 via the adjustment section 502 of the guide element 5, as a result of which the seat pan W is adjusted during an adjustment of the backrest R. The guide element 5 therefore defines a guide contour 50 via the locking section 501 and the adjustment section 502, said guide contour firstly keeping the locking element 4a locked in the comfort region of the backrest R and secondly producing a rotational movement of the transmission lever 6 during an adjustment of the backrest R beyond the comfort region.

Figure 6:
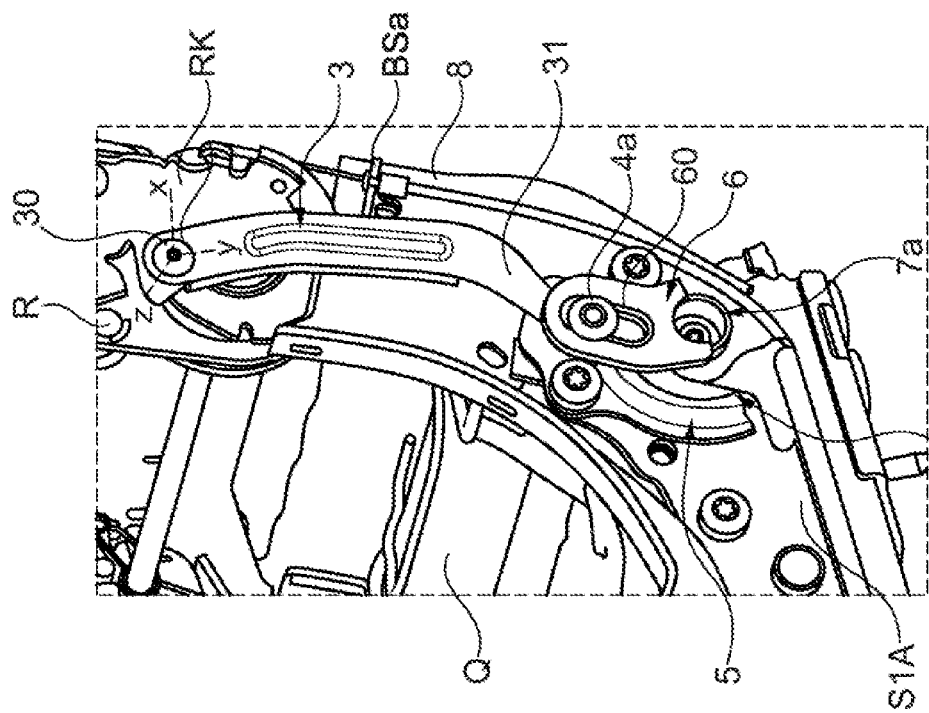
FIG. 6 shows, in a perspective view, part of the seat underframe looking at a first locking element assembly of the locking mechanism for the cushion carrier.
Figure 5:
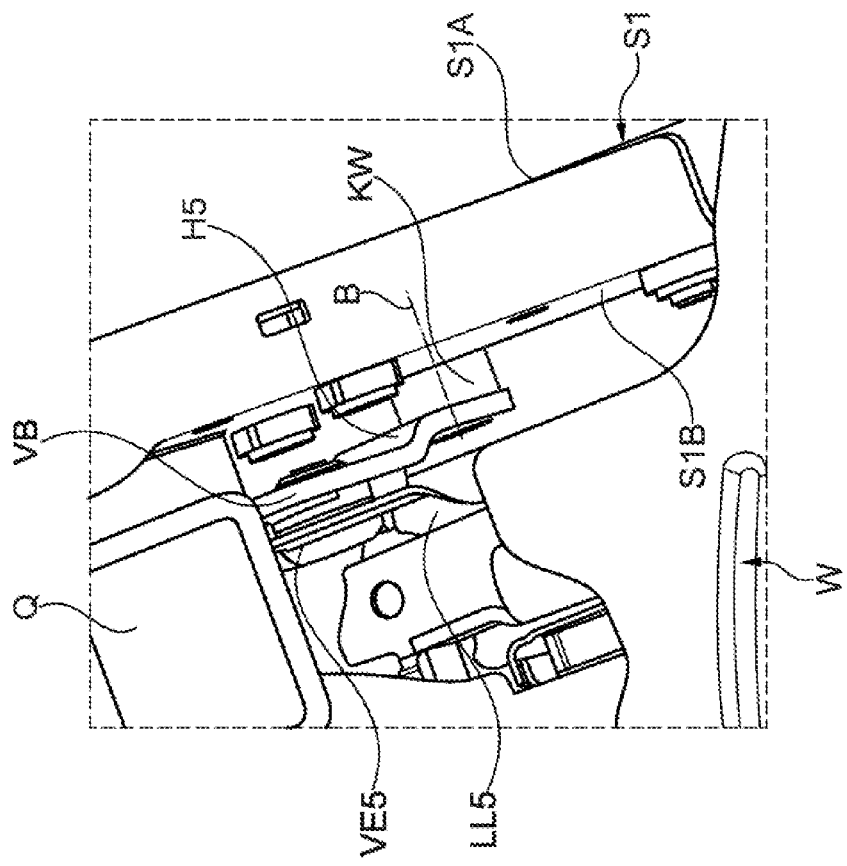
FIG. 5 shows part of the seat underframe looking at a pivot lever for the adjustment of the cushion carrier.
Figure 7A:
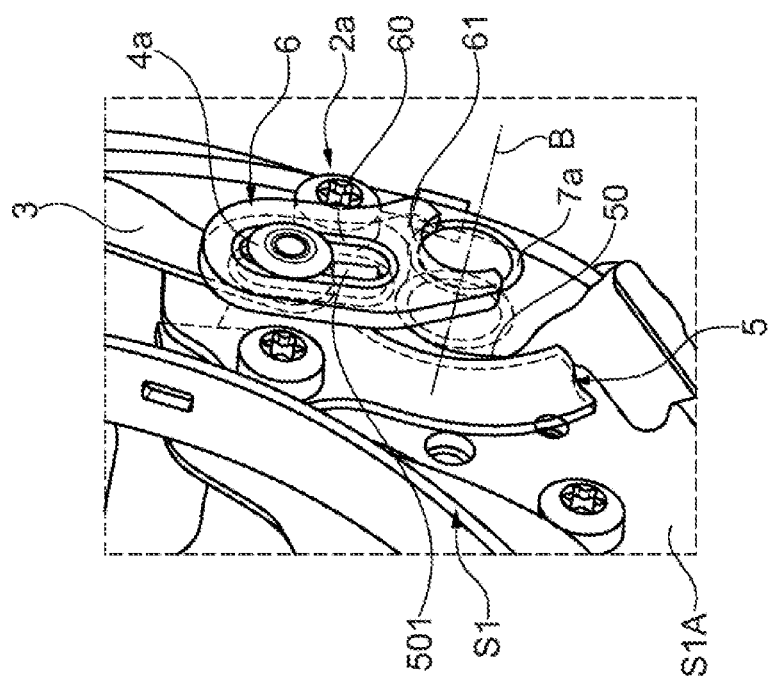
FIGS. 7A-7B show different enlarged views of the first locking element assembly.
Figure 7B:
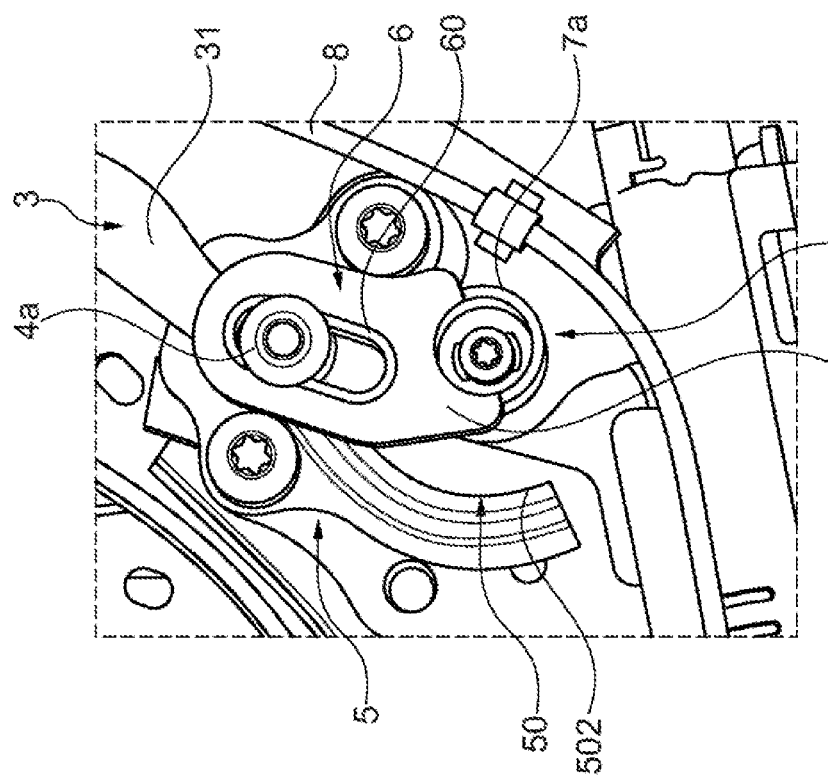

Furthermore, the use of a sliding insert in the slotted guide 60 of the transmission lever 6 is apparent, for example, from FIGS. 6 and 7A-7B. Such an (optional) sliding insert ensures low-friction displacement of the locking element 4a in the slotted guide 60. A corresponding sliding insert can furthermore also be provided at the locking slotted guide 5010 of the guide element 5.

Figure 8:
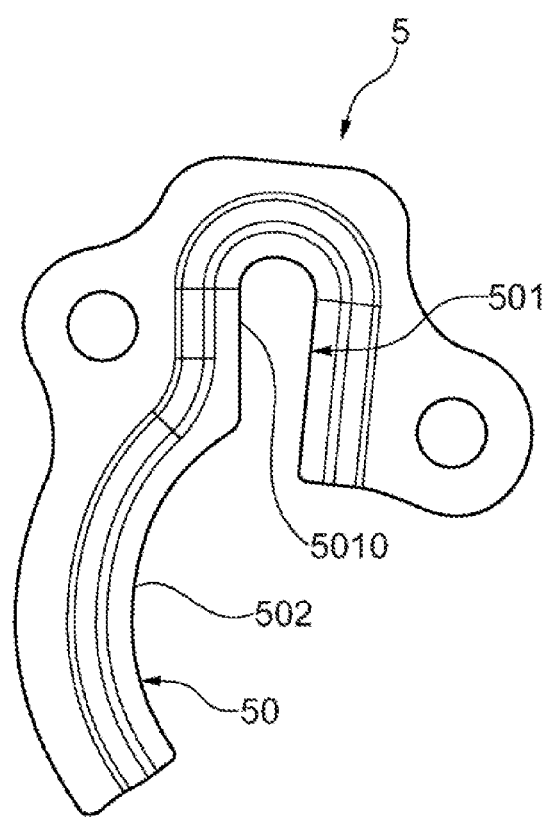
FIG. 8 shows, in an individual illustration, a guide element of the first locking element assembly.
Figure 9:
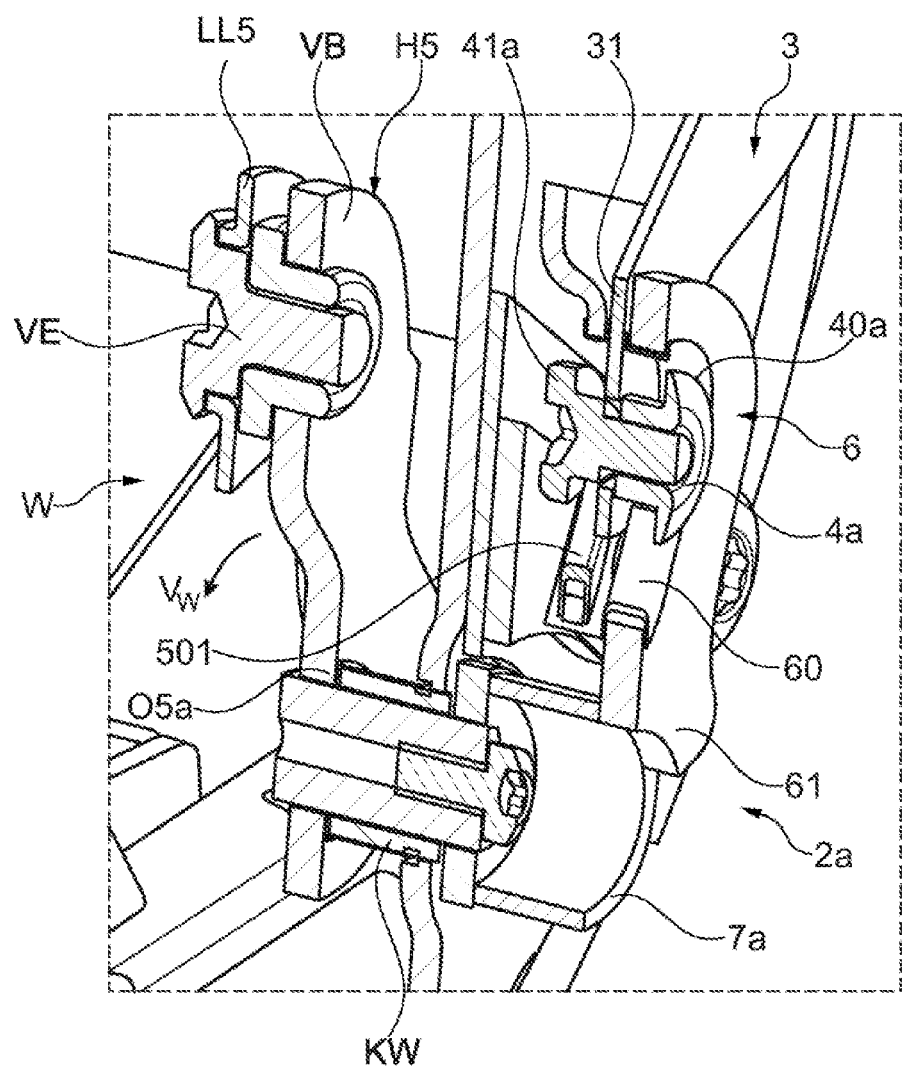
FIG. 9 shows a sectional view of the first locking element assembly.
Figure 10:
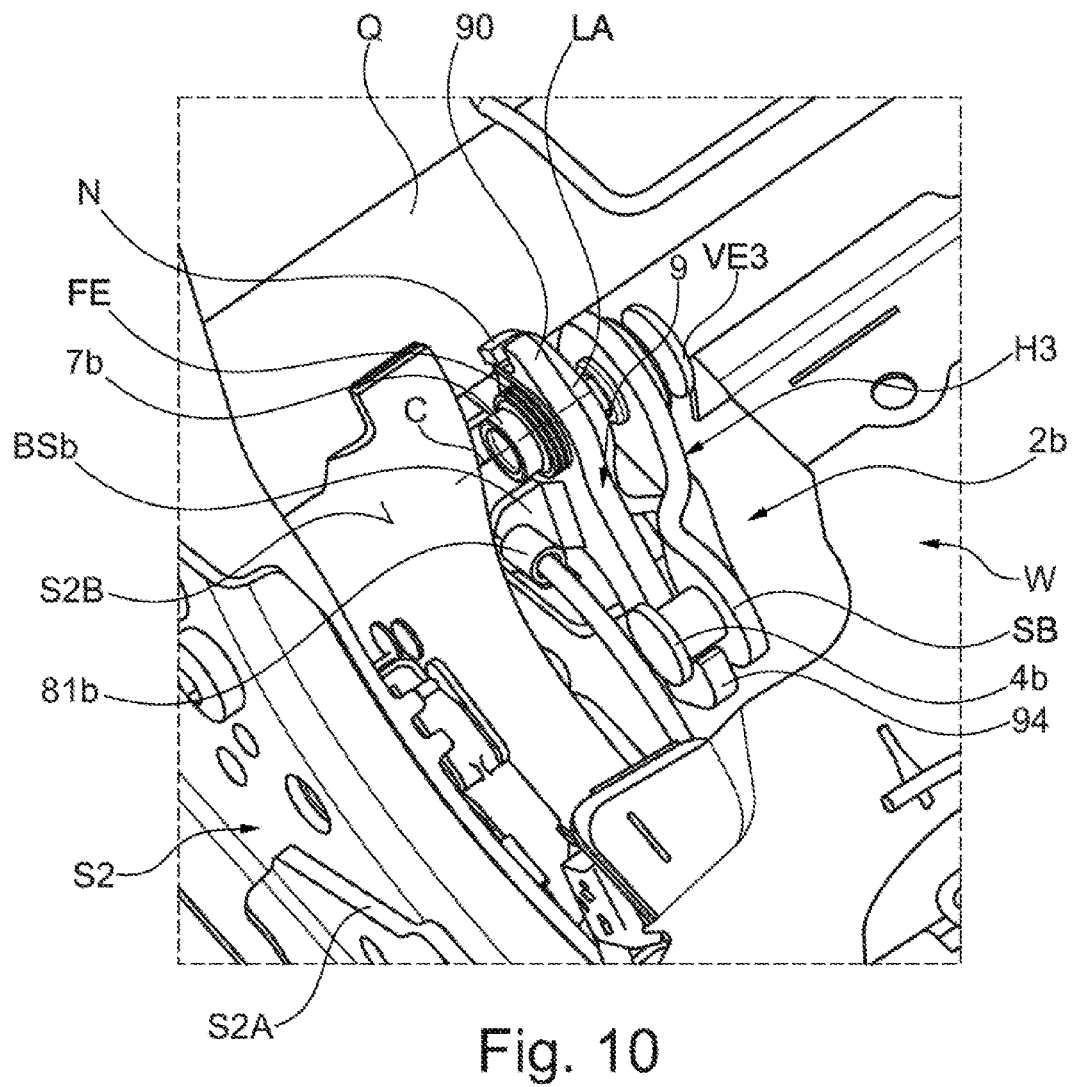
FIG. 10 shows part of the seat underframe with the cushion carrier looking at a second locking element assembly of the locking mechanism.
Figure 11A:
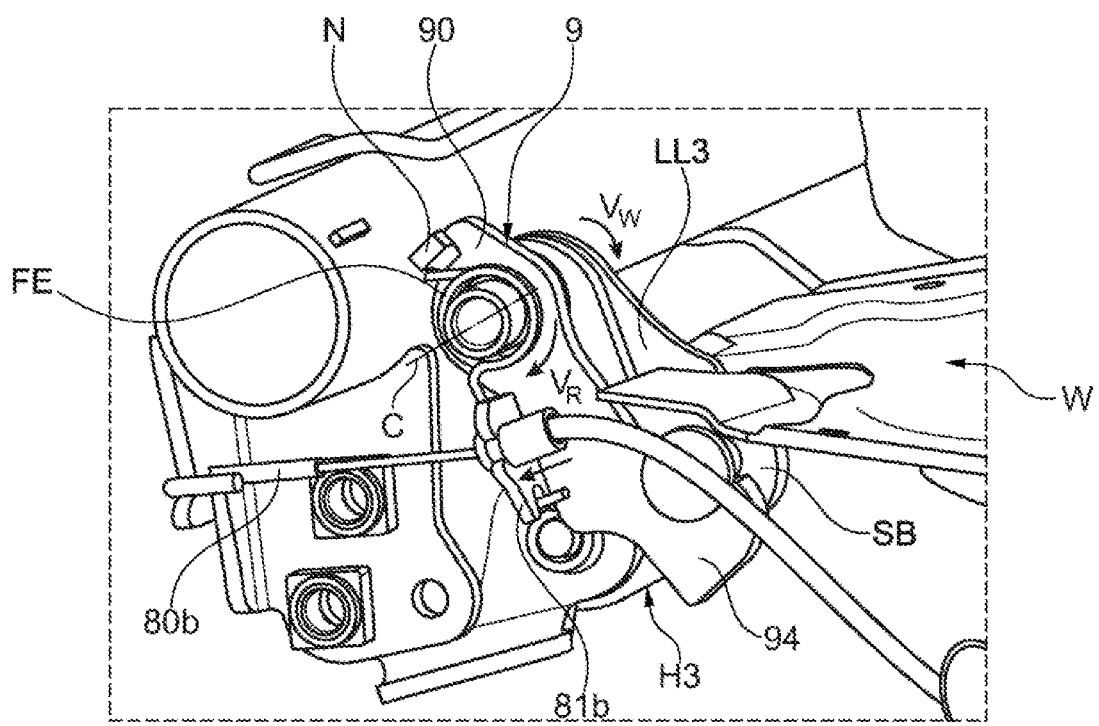
FIG. 11A shows a perspective view of the second locking element assembly looking from a first side.
Figure 11B:
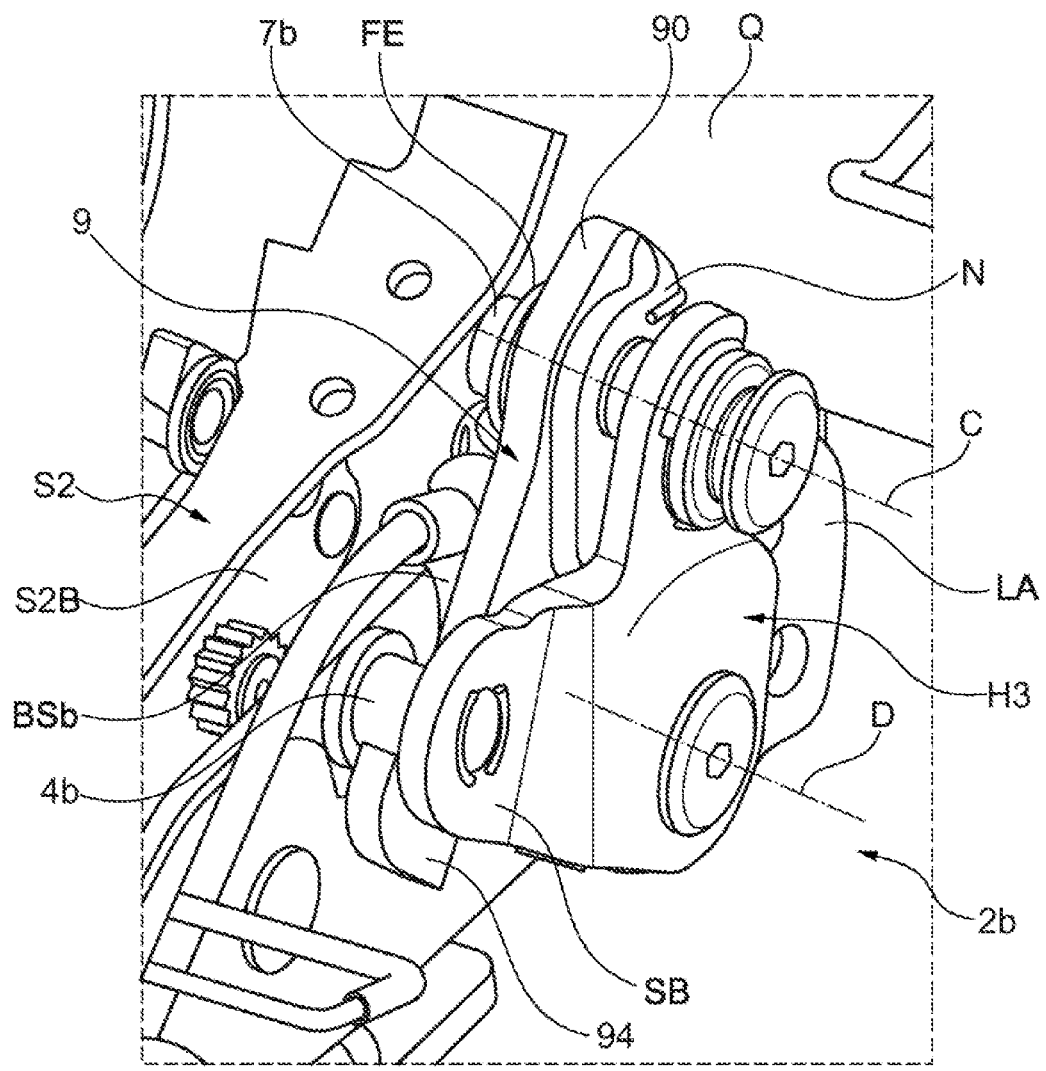
FIG. 11B shows a further perspective view of the second locking element assembly looking from a second side.
Figure 12:
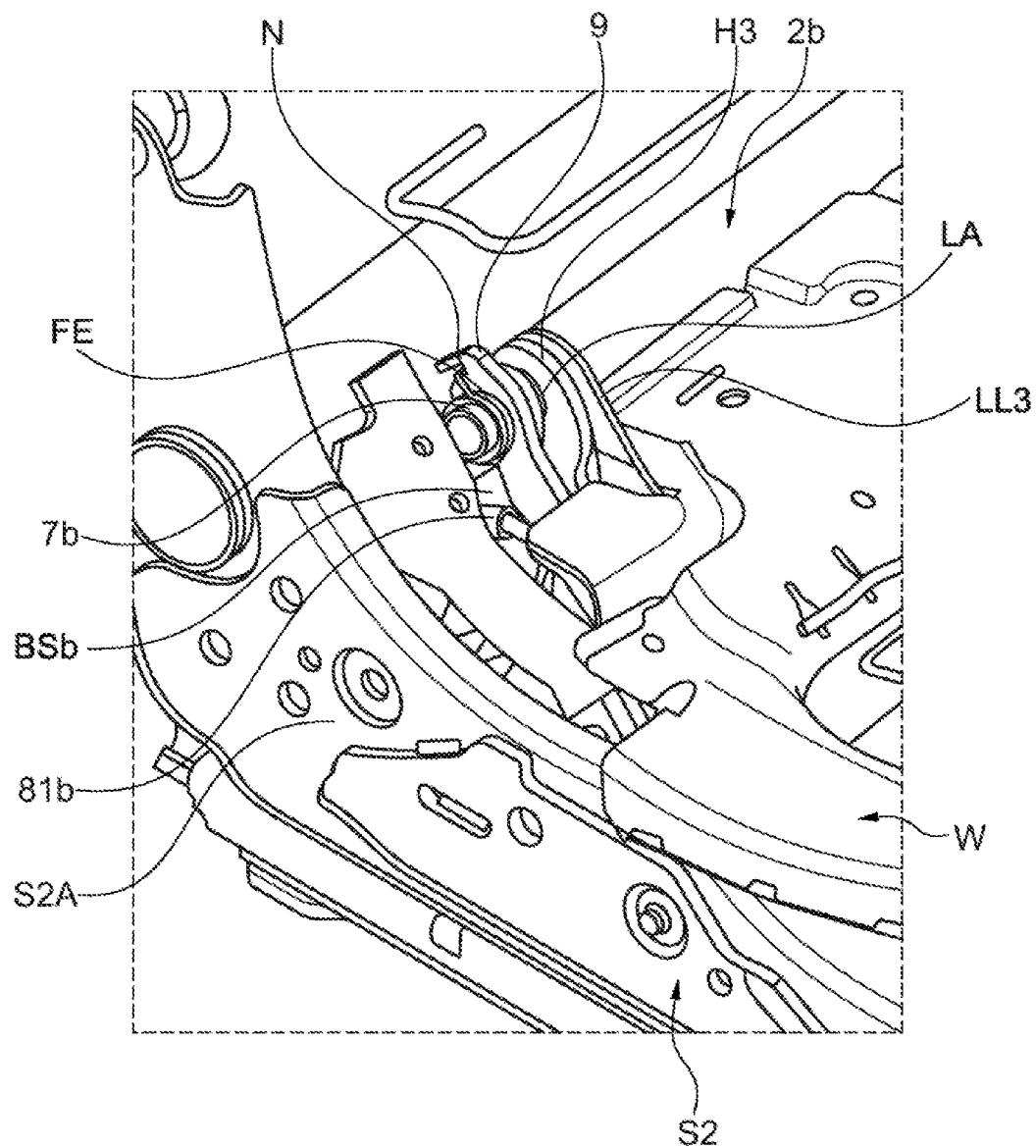
FIG. 12 shows part of the seat underframe with the second locking element assembly and the cushion carrier.

The guide element 5 is fixed to the outer side S1A of the door-side side part S1, for example, via fastening openings which are apparent in FIG. 8. The guide element 5 may be formed of metal.

Part of the locking mechanism 1 is furthermore a second (tunnel-side) locking element assembly 2b. Said locking element assembly 2b is provided for additional locking of the seat pan W in the comfort region of the backrest R and is actuated via a flexible traction means in the form of a Bowden cable 8. In contrast to the first locking element assembly 2a on the door side of the vehicle seat F, no torque for adjusting the seat pan W is transmitted via the tunnel-side locking element assembly 2b. The second, tunnel-side locking element assembly 2b serves exclusively for the additional locking of the seat pan W when the backrest R is in the comfort region, and is actuated separately by the backrest R being folded forward beyond the comfort region. The components of the second locking element assembly 2b that interact with the seat pan W are provided in the region of the second side part S2. The individual components are not present here on the outer side S2A of the second side part S2, but rather in the region of the inner side S2B of the second side part S2.

The second locking element assembly illustrated in detail in the overall view of FIGS. 10, 11A-11B and 12 in addition to FIGS. 1, 4A to 7B and 9 has a pivotable latching element 9 which may be pivoted about a pivot axis C via the Bowden cable 8 when the backrest R is pivoted beyond the comfort region in the direction of its loading position. The pivot axis C of the latching element 9 is formed here by a bearing element in the form of a bearing shaft or a (hollow) bearing pin 7b which protrudes on a bearing section LA fixed to the seat underframe. For the mounting of the on the bearing pin 7b, the latching lever 9 has a bearing section 90 with a bearing opening.

Furthermore, the rear, tunnel-side pivot lever H3 is also mounted pivotably on the bearing section LA. The rear, tunnel-side pivot lever H3 is connected here to the connecting tab LL3 of the seat pan W via a connecting element in the form of a connecting bolt VE3. A locking element 4b in the form of a locking bolt protrudes on said pivot lever H3, said locking element being engaged around by a hook section 94 of the latching lever 9 in a latching position, illustrated in the figures, of the latching element 9 designed as a latching lever. The latching lever 9 acts here in its latching position counter to pivoting of the rear, tunnel-side pivot lever H3 about a pivot axis D on the bearing section LA, which is fixed to the seat underframe, in a pivoting direction $V_W$ and therefore counter to an adjustment of the seat pan W. Consequently, only the latching lever 9 has to be pivoted about its pivot axis C in a pivoting direction $V_9$ (identical to $V_W$ and in the clockwise direction in FIG. 11A) in order to release the locking element 4b of the rear, tunnel-side pivot lever H3 and to be able to pivot the pivot lever H3 so that the seat pan W may be shifted forward in the longitudinal direction L of the seat and downward.

For the corresponding pivoting of the latching lever 9 into a release position in which the latching lever 9 permits pivoting of the pivot lever H3, the Bowden cable 8 is provided. A Bowden support BSb, on which one end of a Bowden sheath 81b is hung, is fixed to the latching lever 9. A core of the Bowden cable is fixed in a manner fixed to the seat underframe via a fastening hook 80b. Furthermore, a Bowden support BSa for one end of a Bowden sheath 81a of the Bowden cable 8 is likewise provided on the door-side side part S1 and a core is secured to the backrest component RK via a further fastening hook 80a. If, consequently, the backrest R is now pivoted forward, a compressive force exerted by the Bowden sheath acts on the latching lever 9, by means of which compressive force said latching lever pivots about its pivot axis C and is brought out of engagement with the locking element 4b, but only if the backrest R has been adjusted beyond the comfort region. The Bowden cable 8 which is laid from the door side to the tunnel side on the seat underframe G thus has at least one compensation means in the form of a lifting compensator in order to compensate for the pulling on the core of the Bowden cable 8 by pivoting of the backrest R in the comfort region and therefore to ensure that a corresponding pivoting movement of the backrest R in the comfort region does not lead to any canceling of the locking via the latching lever 9 and the locking element 4b.

In order furthermore to elastically prestress the latching lever 9 in the direction of its latching position, a spring element FE in the form of a leg spring is provided. The spring element FE is firstly supported here on a lug N of the bearing section LA and secondly on the latching lever 9 in order to prestress the latter in the direction of the locking element 4b. An adjustment of the latching lever 9 in order to release the locking element 4b and therefore the rear, door-side pivot lever H3 consequently has to take place counter to a resetting force applied by the spring element FE. The lug N of the bearing section LA also defines a stop via which a projecting web of the latching lever 9 is prevented from being adjusted beyond the latching position.

During an adjustment of the backrest R in the comfort region, the seat pan W is locked here (in a crash-proof manner) against an adjustment both on the door side and on the tunnel side via the two locking element assemblies 2a and 2b of the locking mechanism 1. During an adjustment of the backrest R beyond the comfort region in the direction of its loading position, firstly on the tunnel side the latching lever 9 is pivoted into a release position and secondly on the door side the locking element 4a is pushed out of the locking slotted guide 5010 of the guide element 5 such that both the tunnel-side and the door-side locking of the seat pan W is canceled and a further adjustment movement of the backrest R is coupled directly to an adjustment movement of the seat pan W. The further adjustment (manually or actuated by external force) of the backrest R in the direction of the loading position then automatically also leads to a lowering of the seat pan W. When the backrest R is reset out of the loading position, it is furthermore ensured via the locking mechanism 1 that the seat pan W is automatically raised again and consequently the adjustment force applied (manually or actuated via external force) for the adjustment of the backrest R is also converted into an adjustment movement of the seat pan W in order to transfer the latter again into a use position. On the door side, during the raising of the backrest R, the coupling rod 3 is pulled and therefore the locking element 4a is first of all displaced along the curved adjustment contour 5020 of the guide element 5. By the sliding of the locking element 4a along the adjustment contour 5020, the transmission lever 6 is rotated back about its pivot axis B and therefore the seat pan W is raised again. The guide contour 50 of the guide element 5 ensures that the locking element 4a does not slide upward too early again in the slotted guide 60 of the transmission lever 6. Only in the comfort region of the backrest R (optionally supplemented by a safety region thereafter) are the slotted guide 60 of the transmission lever 6 and the locking slotted guide 5010 of the guide element 5 arranged one above the other again so that the locking element 4a may slide upward in the slotted guide 60 of the transmission lever 6.

On the door side, the guide contour 50 of the guide element 5 therefore ensures that the seat pan W is again locked in a crash-proof manner against an adjustment movement when the backrest R is in the comfort region again. On the tunnel side, this is achieved via the elastic prestressing of the latching lever 9 by means of the spring element FE.

In a departure from the illustrated variant embodiments (with a door-side locking element assembly with a coupling rod 3 and a bolt-like locking element 4a, which is guided in two slotted guides 60 and 5010 in the comfort region of the backrest R, and locking controlled on the tunnel side via a Bowden cable 8), it may also be provided, for example, that the tunnel-side locking is provided by way of a front pivot lever H2;

in particular the coupling rod 3 and the locking element 4a, which is configured in the manner of a bolt, are not arranged on the outer side of the seat part S1, but rather on the inner side;

a second locking element assembly which is configured in a mirror-inverted manner with respect to the first locking element assembly 2a is provided on the tunnel side; or the backrest R is mounted pivotably on the seat underframe G via a fitting having a swash gear mechanism.

LIST OF REFERENCE SIGNS

1 Locking mechanism
2a, 2b Locking element assembly
3 Coupling rod (coupling element)
30, 31 Rod end
4a, 4b Locking element
40a Sliding nut
41a Locking bolt
5 Guide element
50 Guide contour
501 Locking section
5010 Locking slotted guide
502 Adjustment section
5020 Adjustment contour
6 Transmission lever (transmission element)
60 Slotted guide
61 Connecting region
7a Connecting sleeve
7b Bearing shaft/bearing pin
8 Bowden cable
80a, 80b Core/fastening hook
81a, 81b Bowden sheath
9 Latching lever (latching element)
90 Bearing section
94 Hook section
A Pivot axis
B Pivot axis
BSa, BSb Bowden support
BU1, BU2, BU3 Holding socket
C Pivot axis
D Pivot axis
F Vehicle seat
FE Spring element
H1-H5 Pivot lever
KW Coupling shaft (coupling member)
L Longitudinal direction of the seat
LA Bearing section
LL3, LL4, LL5 Connecting tab (connecting element)
LW Bearing shaft
M Central part
N Lug (stop region)
O1a, O1b, O2a, O2b, O3a, O4a Bearing opening
O5a Connecting opening
Q (Rear) transverse shaft
R Backrest
RK Backrest component
S1, S2 Side part
S1A, S2A Outer side
S1B, S2B Inner side
SA Rail arrangement
SB Locking section
VB Connecting region
VE3, VE5 Connecting bolt (connecting element)
$V_R$, $V_W$, $V_9$ Adjustment direction
W Seat pan (cushion carrier)

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A vehicle seat, comprising:
a seat underframe;
a cushion carrier for a seat part of the vehicle seat, wherein the cushion carrier is mounted adjustably on the seat underframe in order to lower at least one section of the cushion carrier;

a backrest pivotable relative to the seat underframe in a comfort region in order to adjust a use position of the backrest and pivotable relative to the seat underframe in a transition region, outside the comfort region, toward the cushion carrier to a loading position; and a locking mechanism wherein as the backrest is adjusted in the comfort region, the locking mechanism locks the cushion carrier to prevent adjustment of the cushion carrier, and permits adjustment of the cushion carrier by the adjustment of the backrest when the backrest is pivoted beyond the comfort region towards the loading position, wherein the locking mechanism includes at least one locking element assembly, provided with an adjustable locking element coupled to the backrest and a transmission element mounted pivotally about a pivot axis, wherein the locking element is coupled to the backrest and interacts with a guide element, configured to lock the locking element to prevent the locking element from pivoting about the pivot axis when the backrest is pivoted in the comfort region, wherein the transmission element includes a slotted guide for the locking element, wherein the guide element includes a locking section, wherein when the backrest is in the comfort region, the locking element abuts against the locking section, wherein during an adjustment of the backrest in the comfort region, the locking section biases the locking element to move along the slotted guide of the transmission element, wherein the cushion carrier is adjustable by pivoting of the transmission element, wherein during an adjustment of the backrest in the comfort region, the locking element is adjustable along the slotted guide of the transmission element and locks the transmission element to prevent pivoting about the pivot axis, and wherein during an adjustment of the backrest in the transition region, the locking element and the transmission element are each pivotable together with about the pivot axis.

2. The vehicle seat of claim 1, wherein the locking section includes a locking slotted guide configured to engage the locking element so that a section of the locking element is held in a positive locking manner in the locking slotted guide and is displaceable in the locking slotted guide.

3. The vehicle seat of claim 2, wherein the slotted guide of the transmission element and the locking slotted guide of the guide element are arranged so that the slotted guide and the locking slotted guide overlap each other, when the backrest is in the comfort region.

4. The vehicle seat of claim 2, wherein the locking slotted guide of the guide element includes an open end and is arranged with respect to the slotted guide of the transmission element so that the locking element may be pushed out of the locking slotted guide to the open end when the backrest is pivoted beyond the comfort region towards the loading position.

5. The vehicle seat of claim 1, wherein the guide element includes an adjustment section, wherein when the backrest is in the transition region, the locking element abuts against the adjustment section, wherein the locking element is configured to move as the backrest is adjusted beyond the comfort region towards the loading position, so that the transmission element is pivoted to adjust the cushion carrier.

6. The vehicle seat of claim 5, wherein the adjustment section includes a curved adjustment contour, wherein the locking element is configured to move along the adjustment contour by pivoting of the backrest in the transition region.

7. The vehicle seat of claim 1, further comprising a separate coupling element coupled to an element of the backrest and to the locking element to couple the locking element to the backrest.

8. The vehicle seat of claim 1, wherein the transmission element is connected to a coupling member for rotation therewith to transmit an adjustment force for the adjustment of the cushion carrier.

9. The vehicle seat of claim 8, wherein the coupling member is connected to a pivot lever for rotation therewith, wherein the pivot lever is coupled to an element of the cushion carrier.

10. The vehicle seat of claim 1, wherein the locking mechanism includes a first locking element assembly provided on a first side part of the seat underframe and a second locking element assembly provided on a second side part of the seat underframe, wherein the second side part is opposite the first side part.

11. The vehicle seat of claim 10, wherein the first locking element assembly includes the transmission element, and wherein the second locking element assembly includes at least one pivotably mounted latching element, wherein the at least one pivotably mounted latching element locks the cushion carrier to prevent adjustment of the backrest in the comfort region by interaction with a second locking element of the second locking element assembly, and the at least one pivotably mounted latching element is pivotable by pivoting of the backrest beyond the comfort region towards the loading position in order to cancel a locking via the second locking element assembly.

12. The vehicle seat of claim 11, wherein the second locking element of the second locking element assembly is fixed to a pivot lever, wherein the pivot lever is coupled to an element of the seat underframe about a first pivot axis and an element of the cushion carrier about another pivot axis, wherein when the backrest is in the comfort region, the latching element is latched to the second locking element so that the pivot lever is prevented from pivoting about the first pivot axis.

13. The vehicle seat of claim 11, wherein the latching element is elastically prestressed to a latching position by means of at least one spring element, wherein when the latching element is in the latching position, the latching element engages the second locking element.

14. The vehicle seat of claim 11, wherein the second locking element assembly includes at least one flexible traction means configured to transmit an adjustment force to the latching element as the backrest is pivoted beyond the comfort region towards the loading position, to pivot the latching element to a release position so that locking of the cushion carrier by the second locking element assembly is canceled.

15. The vehicle seat of claim 14, wherein the second locking element assembly includes at least one compensation means, wherein pulling on the traction means as the backrest is adjusted in the comfort region towards the loading position is compensated such that pivoting of the latching element in order to cancel the locking of the cushion carrier only takes place as the backrest is adjusted beyond the comfort region.

16. A vehicle seat comprising:
a seat underframe;
a cushion carrier including at least one pivot lever pivotally mounted to the seat underframe, wherein the at least one pivot lever is configured to pivot to move cushion carrier relative to the seat underframe so that at least one section of the cushion carrier may be lowered relative to the seat underframe;
a backrest pivotally attached to the seat underframe and configured to move towards the cushion carrier between a comfort region, a transition region, outside the comfort region, towards a loading position; and
a locking mechanism coupled to the backrest and the seat underframe, and including,
  a guide element fixed to the seat underframe, including a guide contour provided with a locking section and an adjustment section, wherein the locking section of the guide element includes a partially closed end and the adjustment section includes an open end,
  a transmission lever including a slotted guide and mounted to a connecting sleeve, fixed to the at least one pivot lever and configured to rotate about a pivot axis as the at least one pivot lever pivots, and
  an adjustable locking element coupled to the backrest and extending into the guide contour and the slotted guide,
wherein the slotted guide is arranged with respect to the guide element so that as the backrest is adjusted beyond the comfort region, the adjustable locking element is pushed out the locking section,
wherein as the backrest is adjusted in the comfort region, the adjustable locking element moves along the locking section and a portion of the slotted guide to prevent rotation of the transmission lever and the adjustable locking element, and wherein as the backrest is adjusted in the transition region, the adjustable locking element moves along the adjustment contour and to an end portion of the slotted guide so that the transmission lever and the adjustable locking element pivot about the pivot axis.

17. A vehicle seat, comprising:
a seat underframe;
a cushion carrier for a seat part of the vehicle seat, wherein the cushion carrier is mounted adjustably on the seat underframe in order to lower at least one section of the cushion carrier;
a backrest pivotable relative to the seat underframe in a comfort region in order to adjust a use position of the backrest and pivotable relative to the seat underframe in a transition region, outside the comfort region, toward the cushion carrier to a loading position; and
a locking mechanism wherein as the backrest is adjusted in the comfort region, the locking mechanism locks the cushion carrier to prevent adjustment of the cushion carrier, and permits adjustment of the cushion carrier by the adjustment of the backrest when the backrest is pivoted beyond the comfort region towards the loading position,
wherein the locking mechanism includes at least one locking element assembly, provided with an adjustable locking element coupled to the backrest and a transmission element mounted pivotally about a pivot axis, wherein
the transmission element includes a slotted guide for the locking element,
the cushion carrier is adjustable by pivoting of the transmission element,
wherein during an adjustment of the backrest in the comfort region, the locking element is adjustable along the slotted guide of the transmission element and locks the transmission element to prevent pivoting about the pivot axis, and
wherein during an adjustment of the backrest in the transition region, the locking element and the transmission element are each pivotable together with about the pivot axis.

18. A vehicle seat, comprising:
a seat underframe;
a cushion carrier for a seat part of the vehicle seat, wherein the cushion carrier is mounted adjustably on the seat underframe in order to lower at least one section of the cushion carrier;
a backrest pivotable relative to the seat underframe in a comfort region in order to adjust a use position of the backrest and pivotable relative to the seat underframe in a transition region, outside the comfort region, toward the cushion carrier to a loading position; and
a locking mechanism including a first locking element assembly provided on a first side part of the seat underframe and a second locking element assembly provided on a second side part of the seat underframe, wherein the second side part is opposite the first side part and the first locking element assembly includes an adjustable locking element coupled to the backrest and a transmission element mounted pivotally about a pivot axis, wherein as the backrest is adjusted in the comfort region, the locking mechanism locks the cushion carrier to prevent adjustment of the cushion carrier, and permits adjustment of the cushion carrier by the adjustment of the backrest when the backrest is pivoted beyond the comfort region towards the loading position,
wherein the second locking element assembly includes at least one pivotably mounted latching element, wherein the at least one pivotably mounted latching element locks the cushion carrier to prevent adjustment of the backrest in the comfort region by interaction with a second locking element of the second locking element assembly, and the at least one pivotably mounted latching element is pivotable by pivoting of the backrest beyond the comfort region towards the loading position in order to cancel a locking via the second locking element assembly,
wherein the second locking element is fixed to a pivot lever, wherein the pivot lever is coupled to an element of the seat underframe about a first pivot axis and an element of the cushion carrier about another pivot axis, wherein when the backrest is in the comfort region, the latching element is latched to the second locking element so that the pivot lever is prevented from pivoting about the first pivot axis,
wherein the transmission element includes a slotted guide for the locking element,
wherein the cushion carrier is adjustable by pivoting of the transmission element,
wherein during an adjustment of the backrest in the comfort region, the locking element is adjustable along the slotted guide of the transmission element and locks the transmission element to prevent pivoting about the pivot axis, and
wherein during an adjustment of the backrest in the transition region, the locking element and the transmission element are each pivotable together with about the pivot axis.

* * * * *